United States Patent
Yahata et al.

(10) Patent No.: US 10,497,400 B2
(45) Date of Patent: *Dec. 3, 2019

(54) RECORDING MEDIUM, PLAYBACK METHOD, AND PLAYBACK DEVICE

(71) Applicant: PANASONIC INTELLECTUAL PROPERTY CORPORATION OF AMERICA, Torrance, CA (US)

(72) Inventors: Hiroshi Yahata, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/698,750

(22) Filed: Sep. 8, 2017

(65) Prior Publication Data

US 2017/0372750 A1 Dec. 28, 2017

Related U.S. Application Data

(63) Continuation of application No. 15/471,041, filed on Mar. 28, 2017, now Pat. No. 10,255,950, which is a
(Continued)

(30) Foreign Application Priority Data

Jul. 28, 2015 (JP) .................. 2015-149056

(51) Int. Cl.
*H04N 9/87* (2006.01)
*H04N 5/85* (2006.01)
(Continued)

(52) U.S. Cl.
CPC ........ *G11B 27/10* (2013.01); *G11B 20/00007* (2013.01); *G11B 20/10* (2013.01);
(Continued)

(58) Field of Classification Search
CPC ... G11B 27/10; G11B 20/00007; G11B 20/10; G11B 20/1251; G11B 27/105;
(Continued)

(56) References Cited

U.S. PATENT DOCUMENTS

| | | | | |
|---|---|---|---|---|
| 6,088,506 | A | 7/2000 | Yoshio et al. | |
| 2005/0238326 | A1* | 10/2005 | Yahata | H04N 5/783 386/240 |
| 2011/0255846 | A1* | 10/2011 | Shimada | G11B 20/10 386/356 |

FOREIGN PATENT DOCUMENTS

JP 9-282848 10/1997

OTHER PUBLICATIONS

The Extended European Search Report, dated Sep. 25, 2017 from the European Patent Office (EPO), for the related European Patent Application No. 15851042.0.

* cited by examiner

*Primary Examiner* — Thai Q Tran
*Assistant Examiner* — Nienru Yang
(74) *Attorney, Agent, or Firm* — Greenblum & Bernstein, P.L.C.

(57) ABSTRACT

A playback device and playback method are provided for reading out and playing content from a recording medium in which are recorded a video stream that is encoded video information, map information, and bitrate information of the video stream. The map information includes playback start time information, start position information, and size information. The playback method includes reading out the map information and the bitrate information, and determining the stipulated data size in accordance with the bitrate information. The playback method also includes acquiring the picture from the video stream based on the result of the determination, and the start position information and the size
(Continued)

information included in the map information that has been read out. The method further includes decoding and playing the acquired picture, wherein the stipulated data size differs between 2K resolution of the video stream and 4K resolution of the video stream.

4 Claims, 34 Drawing Sheets

Related U.S. Application Data continuation of application No. PCT/JP2015/005002, filed on Oct. 1, 2015.

(60) Provisional application No. 62/065,157, filed on Oct. 17, 2014.

(51) Int. Cl.
*H04N 9/804* (2006.01)
*H04N 9/82* (2006.01)
*G11B 27/10* (2006.01)
*G11B 20/10* (2006.01)
*G11B 27/32* (2006.01)
*G11B 20/12* (2006.01)
*G11B 20/00* (2006.01)

(52) U.S. Cl.
CPC ........ *G11B 20/1251* (2013.01); *G11B 27/105* (2013.01); *G11B 27/329* (2013.01); *H04N 5/85* (2013.01); *H04N 9/8045* (2013.01); *H04N 9/8233* (2013.01); *H04N 9/87* (2013.01); *G11B 2220/2541* (2013.01); *G11B 2220/2562* (2013.01)

(58) Field of Classification Search
CPC .......... G11B 27/329; G11B 2220/2541; G11B 2220/2562; H04N 5/85; H04N 9/8045; H04N 9/8233; H04N 9/87
USPC ........................................................ 386/241
See application file for complete search history.

FIG. 24

| 0 | Language Code | 11 | Player audio mixing mode for Karaoke | 22 | reserved |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

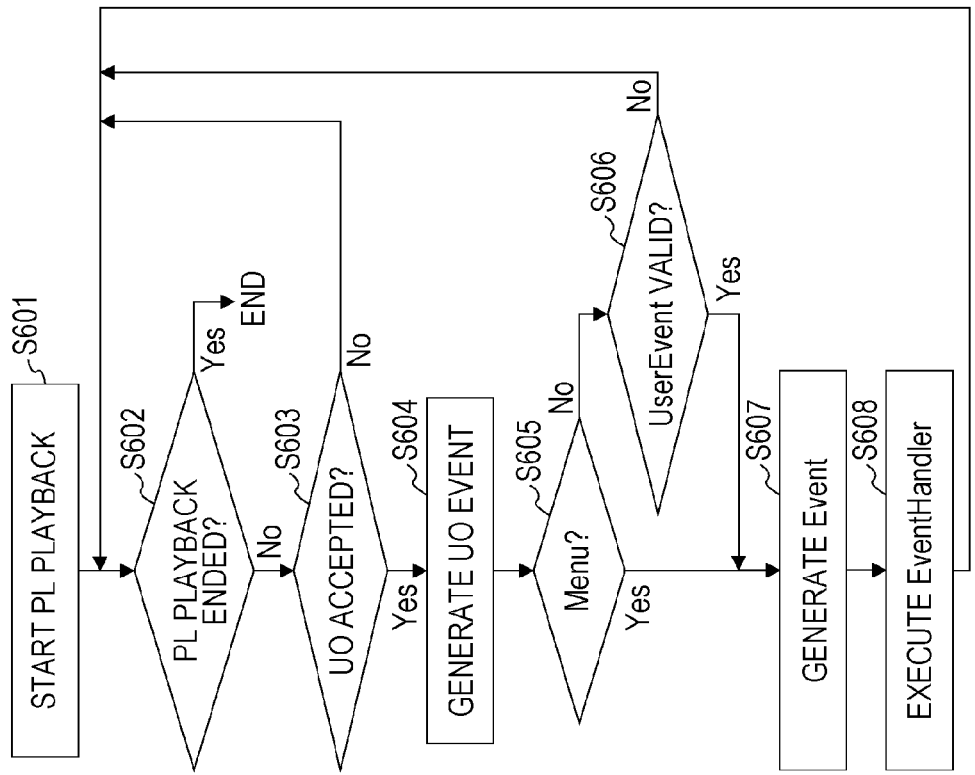
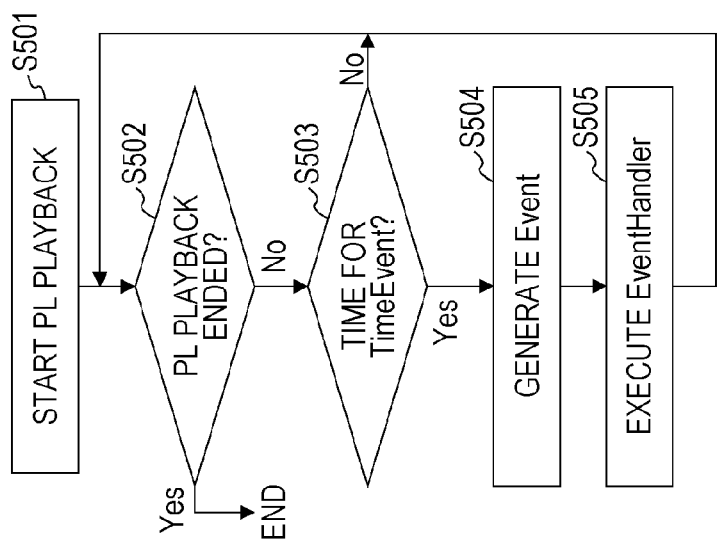

FIG. 33A

*I_end meaning when the video resolution is equal to or less than 1920x1080*

| I_end value | meaning |
|---|---|
| 000b | I_MUX_SIZE <= 100 KB * 1 |
| 001b | 100 KB * 1 < I_MUX_SIZE <= 100 KB * 2 |
| .. | .. |
| 110b | 100 KB * 6 < I_MUX_SIZE <= 100 KB * 7 |
| 111b | 100 KB * 7 < I_MUX_SIZE |

FIG. 33B

*I_end meaning when the video resolution is equal to or larger than 3840x2160*

| I_end value | meaning |
|---|---|
| 000b | I_MUX_SIZE <= 192 KB * 4 |
| 001b | 192 KB * 4 < I_MUX_SIZE <= 192 KB * 8 |
| .. | .. |
| 110b | 192 KB * 24 < I_MUX_SIZE <= 192 KB * 28 |
| 111b | 192 KB * 28 < I_MUX_SIZE |

NOTE) 192 KB is the lowest common multiple of ECC size and TTS block size

RECORDING MEDIUM, PLAYBACK METHOD, AND PLAYBACK DEVICE

This is a continuation application of U.S. patent application Ser. No. 15/471,041, filed Mar. 28, 2017, which is a continuation of International Patent Application No. PCT/JP2015/005002, filed Oct. 1, 2015, which claims the benefit of U.S. Provisional Application No. 62/065,157, filed Oct. 17, 2014, and priority to Japanese Application No. 2015-149056, filed Jul. 28, 2015. The disclosures of these documents, including the specifications, and drawings, and claims are incorporated herein by reference in their entirety.

BACKGROUND

1. Technical Field

The present disclosure relates to a recording medium in which is recorded an encoded video stream, a playback method of the video stream, and a playback device.

2. Description of the Related Art

Technology relating to digital versatile discs (DVD) has conventionally been disclosed (e.g., Japanese Unexamined Patent Application Publication No. 9-282848).

SUMMARY

In one general aspect, the techniques disclosed here feature a recording medium according to an aspect of the present disclosure is a video stream that is encoded video information, map information, and bitrate information of the video stream. The map information includes playback start time information of a picture that is included in the video stream and is independently decodable, start position information indicating a data start position of the picture in the video stream, and size information indicating data size of a section where the picture is recorded in the video stream, based on a predetermined stipulated data size. The stipulated data size differs in accordance with the bitrate information. According to the above form, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 24 is a diagram illustrating a list of system parameters (SPRM);

FIGS. 29A and 29B illustrate flowcharts of the flow of processing relating to a time event in a BD-ROM player, and the flow of processing relating to a user event in a BD-ROM player;

FIGS. 33A and 33B are diagrams describing the meaning of I_end in a case where a 3-bit field is used as I_end.

DETAILED DESCRIPTION

However, further improvement was needed with the aforementioned Japanese Unexamined Patent Application Publication No. 9-282848. The present Inventors found that a problem occurs relating to the technology mentioned in the "Related Art". This problem will be described below in detail.

Most representative of information recording media recording video data is the DVD (hereinafter, may also be referred to as "Standard Definition" (SD-DVD). A conventional DVD will be described below.

Figure 1:
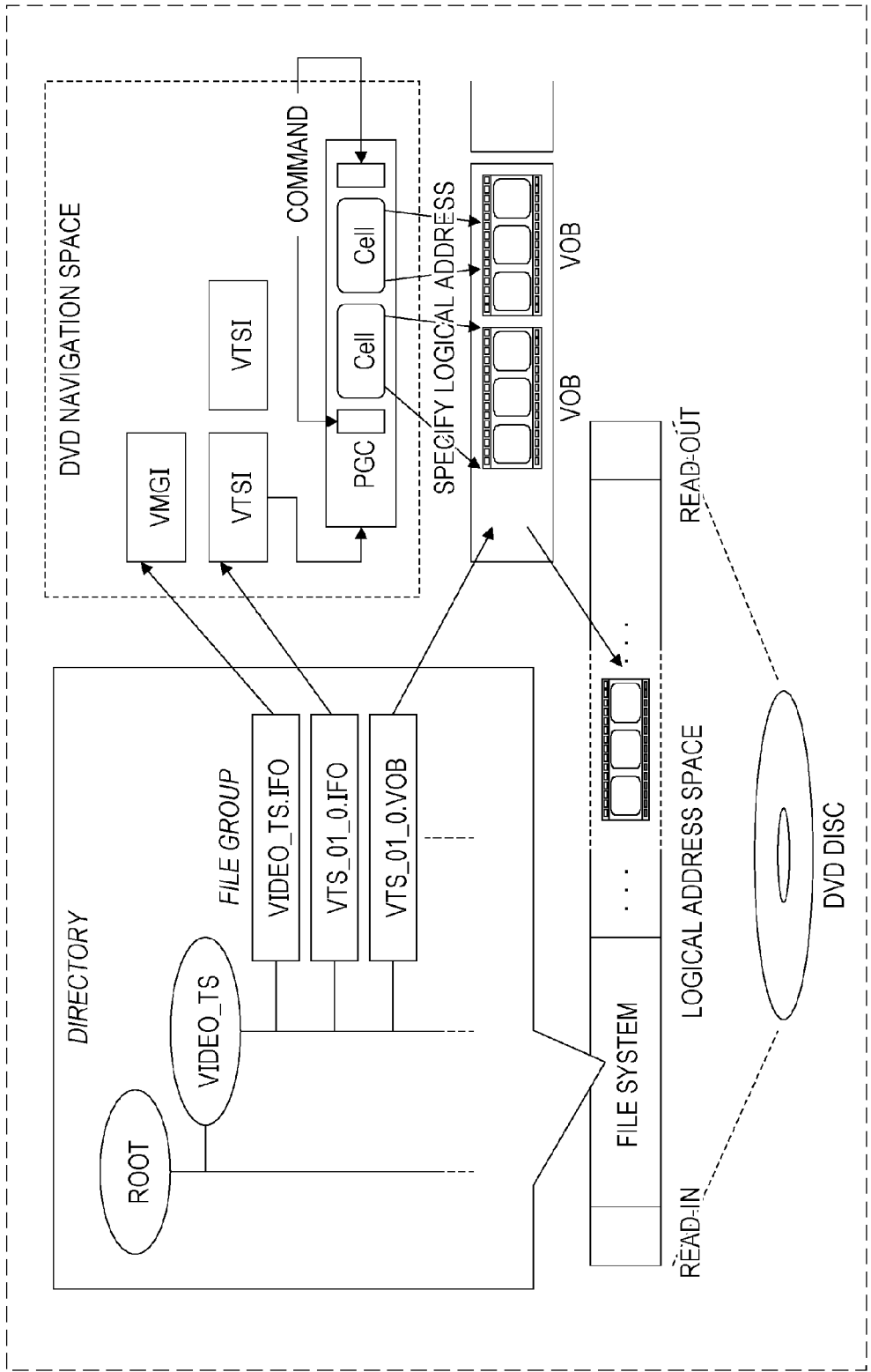
FIG. 1 is a diagram illustrating an SD-DVD structure.

FIG. 1 is a diagram illustrating the structure of an SD-DVD. As illustrated to the lower side of FIG. 1, the DVD disc has a logical address space provided between a read-in and a read-out. Volume information of a file system is recorded from the beginning of the logical address space, and after that is recorded application data such as video, audio, and so forth.

The file system is an arrangement for managing data, that is stipulated by Standards such as ISO9660, Universal Disc Format (UDF), and so forth, and is an arrangement to express data on the disc in increments called directories or files. There are file systems called File Allocation Tables (FAT) and NT File System (NTFS) in everyday-use personal computers (PC) as well, whereby data recorded in a hard disk are expressed on the computer as structures called directories or files, thereby improving usability.

In the case of an SD-DVD, both UDF and ISO9660 file systems are used. The two together are also referred to as "UDF bridge". The recorded data is arranged so that the data can be read out by a file system driver according to either UDF or ISO9660. Note that the DVD used here is a ROM disc for packaged media, to which writing is physically impossible.

Data recorded in the DVD can be viewed through the UDF bridge as directories or files such as illustrated to the upper left in FIG. 1. Immediately below the root directory ("ROOT" in FIG. 1) is placed a directory called "VIDEO_TS", and it is here that DVD application data is recorded. Application data is recorded as multiple files, primary files being the following types of files.

VIDEO_TS.IFO Disc play control information file
VTS_01_0.IFO Video title set #1 play control information file
VTS_01_0.VOB Video title set #1 stream file
. . . .

As shown in the above example, two suffixes are stipulated. "IFO" is a suffix indicating that the file has play control information recorded therein, and "VOB" is a suffix indicating that the file has an MPEG stream, which is audiovisual (AV) data, recorded therein.

Play control information is information attached to the AV data, such as information to realize interactivity employed with the DVD (technology to dynamically change playing in response to user operations), metadata, and so forth. Play control information is commonly referred to as navigation information regarding DVDs.

The play control information files include the "VIDEO_TS.IFO" that manages the entire disc, and the "VTS_01_0.IFO" that is play control information for individual video title sets. Note that multiple titles, in other words, multiple different movies and tunes, can be recorded in a single disc in the case of DVD. Now, "01" in the file name body indicates the No. of the video title set, and in the case of the video title set #2, for example, this is "VTS_02_0.IFO".

The upper right portion in FIG. 1 is DVD navigation space in the application layer of the DVD, and is the logical structure space where the aforementioned play control information is loaded. Information within the "VIDEO_TS.IFO" is loaded in the DVD navigation space as VIDEO Manager Information (VMGI), as well as are "VTS_01_0.IFO" and play control information existing for each of other video title sets as Video Title Set Information (VTSI).

Described in the VTSI is Program Chain Information (PGCI) which is information of a play sequence called Program Chain (PGC). PGCI is made up of a set of Cells and a type of programing information called commands.

A Cell itself is information indicating a partial section or a whole section of a VOB (short for Video Object, and indicates an MPEG stream), and playing a Cell means to play the section of this VOB instructed by the Cell.

Commands are processed by a virtual machine of the DVD, and are close to JavaScript (a registered trademark) and so forth executed in browsers to display Web pages, for example. However, while JavaScript (registered trademark) performs window or browser control (e.g., opening a new browser window, etc.) besides logical operations, DVD command differ in that they only execute playback control of AV titles, e.g., instructing a chapter to play or the like, for example, besides logical operations.

A Cell has the start and end addresses (logical addresses) of a VOB recorded in the disc as internal information thereof. A player reads out data using the start and end address information of the VOB described in the Cell, and executes playback.

Figure 2:
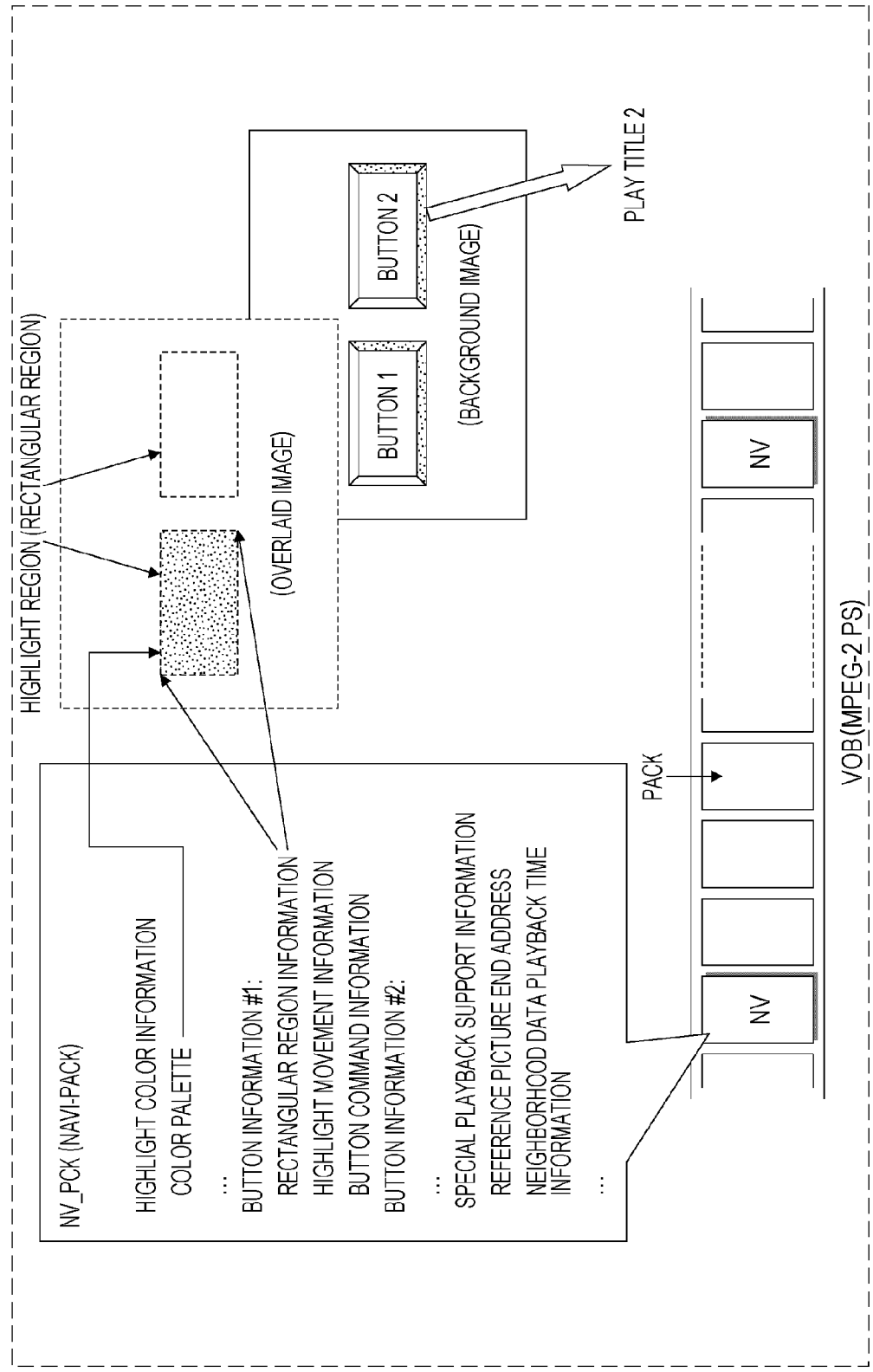
FIG. 2 is a schematic diagram for describing navigation information embedded in an MPEG stream, which is AV data.

FIG. 2 is an overview for describing navigation information embedded in an MPEG stream, which is AV data. Interactivity, which is a feature of the SD-DVD, is realized not only by the navigation information recorded in the aforementioned "VIDEO_TS.IFO" and "VTS_01_0.IFO" and so forth. Several important sets of information are multiplexed in the VOB along with video and audio data, using a dedicated carrier called navigation packs (called navi-pack or NV_PCK).

A menu screen will be described here as a simple example of interactivity. Several buttons are shown on the menu screen, with processing to be executed defined for each button when that button is selected.

One button is selected on the menu screen (a translucent color is overlaid on the selected button in highlight that button, indicating to the user that button is in a selected state), and the user can move the button in the selected state to any of the buttons above or below, to the left or to the right, using arrow keys on a remote controller.

Using the arrow keys of the remote controller to move the highlight to the button to be selected and executed, and okaying (pressing an OK key) executes the program of the corresponding command. Generally, playback of a corresponding title or chapter is executed by the command.

The upper left portion in FIG. 2 shows an overview of information stored in an NV_PCK. Highlight color information, information of individual buttons, and so forth, are included in the NV_PCK. Color palette information is described in the highlight color information, specifying the highlight translucent color to be displayed overlaid.

Described in the button information are rectangular region information which is the position information of each button, moving information from that button to other buttons (specification of destination buttons corresponding to each operation of the arrow keys by the user), and button command information (a command to be executed when that button is okayed).

The highlight on the menu screen is created as an overlaid image, as illustrated to the upper right portion in FIG. 2. The overlaid image is an object where rectangular region information of button information has been given color in color palette information. This overlaid image is composited with the background image illustrated at the right portion in FIG. 2, and displayed on the screen.

The menu screen of a DVD is realized as described above. The reason why part of the navigation data is embedded in the stream using an NV_PCK is as follows. That is, to realize without problem processing where synchronization timing readily becomes problematic, such as dynamically updating menu information synchronously with the stream, for example, displaying a menu screen for just five to ten minutes partway through playing a movie.

Another major reason is to improve user operability, such as to store information for supporting special playback in an NV_PCK, so that AV data can be decoded and played smoothly during non-normal playback, such as fast-forward and fast-rewind while playing the DVD.

Figure 3:
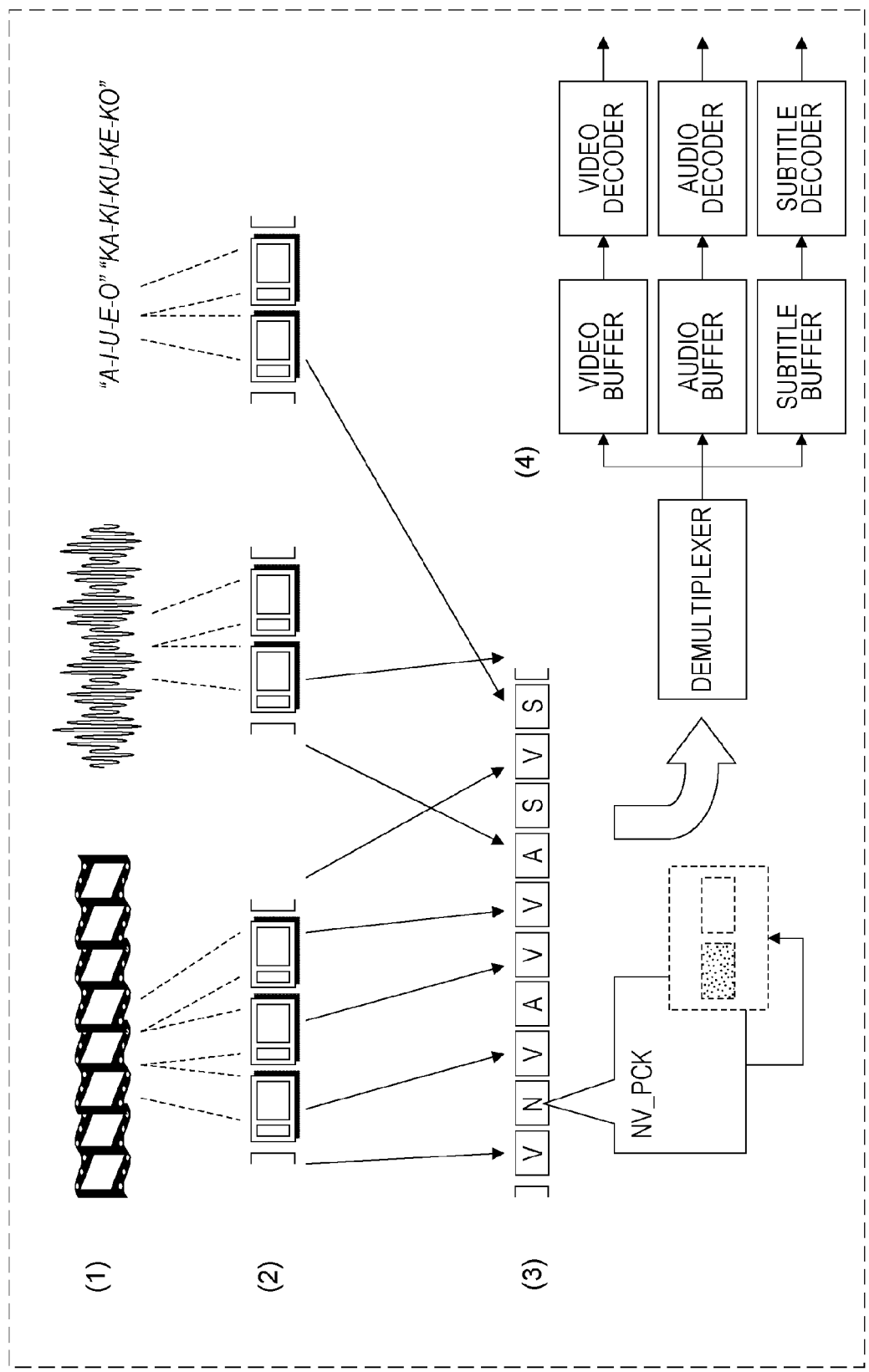
FIG. 3 is a schematic diagram illustrating a VOB structure in a DVD.

FIG. 3 is a schematic diagram illustrating the configuration of a VOB in a DVD. Data such as video, audio, and subtitles ((1) in FIG. 3) are packetized and packed according to the MPEG system (ISO/IEC13818-1) Standard ((2) in FIG. 3), and these are multiplexed to form a single MPEG program stream ((3) in FIG. 3), as illustrated in FIG. 3. The NV_PCKs including button commands for realizing interactivity are also multiplexed along with these, as described above.

A feature of multiplexing in the MPEG system is that the individual pixels of data that are multiplexed are in a bit string based on decoding order, but the bit string is not necessarily formed in playback order, that is to say decoding order, among the multiplexed data, i.e., among the video, audio, and subtitles.

This is due to a decoder model of the MPEG system stream ((4) in FIG. 3, generally referred to as System Target Decoder or STD) has decoder buffers corresponding to each elementary stream after demultiplexing, that temporarily stored the data until the decoding timing.

These decoder buffers have different sized according to each of the individual elementary streams, having 232 kB for video, 4 kB for audio, and 52 kB for subtitles. Accordingly, the data input timing to each decoder buffer differs among the individual elementary streams, so there is discrepancy between the order of forming the bit string as the MPEG system stream, and the timing of displaying (decoding). That is to say, the subtitle data multiplexed along with the video data is not necessarily decoded at the same time.

Now, in a large-capacity recording media such as a Blu-ray (registered trademark) disc, there is a possibility that extremely high-definition video information can be stored. Note that Blu-ray (registered trademark) disc, is also called BD or BD-ROM.

For example, it is conceivable that video information such as 4K (video information having resolution of 3840×2160 pixels) or HDR (high-luminosity video information, generally called High Dynamic Range) may be stored in a BD.

In a case where video information and HDR having 4K pixel resolution is recorded in an BD, there are cases where an extremely high bitrate, close to 100 Mbps is necessary to achieve sufficient image quality, even if the newest video encoding codec (HEVC or the like) is used. On the other hand, there still are many cases where bonus content or the like has resolution of 2K (1920×1080 pixels), and it is thought that the bitrate of bonus content will continue to be 10 Mbps or lower hereafter as well.

BDs have a management table including size information of I pictures in an MPEG-2 TS multiplexed stream in a database file, to improve random accessibility of the player. However, current management tables do not assume video streams having high bitrates of around 100 Mbps. Accordingly, there is a problem that current management tables are not able to appropriately express the size of I pictures included in high-bitrate video streams. The Present Inventors studied the following improvement measures to solve the above problem.

Recorded in a recording medium according to an aspect of the present disclosure is a video stream that is encoded video information, map information, and bitrate information of the video stream. The map information includes playback start time information of a picture that is included in the video stream and is independently decodable, start position information indicating a data start position of the picture in the video stream, and size information indicating data size of a section where the picture is recorded in the video stream, based on a predetermined stipulated data size. The stipulated data size differs in accordance with the bitrate information.

Accordingly, the size information can appropriately indicate the end position of an I picture both when the bitrate indicated by the bitrate information is higher than the predetermined value and equal to or lower than the predetermined value. That is to say, such a recording medium can improve random accessibility of a player (playback device).

The size information may be a value indicating data size of a section where the picture is recorded based on a first stipulated data size, in a case where the bitrate information indicates a bitrate larger than a predetermined value, and be a value indicating data size of a section where the picture is recorded based on a second stipulated data size that is smaller than the first stipulated data size, in a case where the bitrate information indicates a bitrate equal to or smaller than the predetermined value.

Accordingly, the definition (meaning) of size information is changed in accordance with the bitrate of the video stream. Thus, the size information can appropriately indicate the end position of an I picture both when the bitrate indicated by the bitrate information is higher than the predetermined value and equal to or lower than the predetermined value. That is to say, such a recording medium can improve random accessibility of a player.

The first stipulated data size may be a value allocated every 192×1024×n bytes (where n is a natural number).

The smallest common multiple of 64 KB, which is the ECC block size that is the read unit of a BD, and the 6 KB, which is TTS block size that is the data structure unit of the digital stream, is 192 KB. Accordingly, expressing size information by a natural multiple of 192×1024 aligns the data size. Therefore, such a BD can realize simplification and high speed of read processing and so forth of the player when performing random access processing.

The predetermined value may be 48,000,000 bits/second.

The size information of such a recording medium can appropriately indicate the end position of I pictures in both cases where the bitrate of the bitstream is higher than 48 Mbps and where 48 Mbps or lower. That is to say, such a recording medium can improve the random accessibility of the player.

The size information may be a 3-bit long value.

Such a recording medium can appropriately indicate the end position of I pictures even in cases where the size information is a restricted information amount (3 bits).

A playback method according to an aspect of the present disclosure is a playback method of reading out and playing content from a recording medium, in which is recorded a video stream that is encoded video information, map information, and bitrate information of the video stream. The map information includes playback start time information of a picture that is included in the video stream and is independently decodable, start position information indicating a data start position of the picture in the video stream, and size information indicating data size of a section where the picture is recorded in the video stream, based on a predetermined stipulated data size. The stipulated data size differs in accordance with the bitrate information. The playback method includes: reading out the map information and bitrate information; determining the stipulated data size of the size information included in the map information that has been read out, in accordance with the bitrate information that has been read out; acquiring the picture from the video stream based on the results of determination, and the start position information and the size information included in the map information that has been read out; and decoding and playing the acquired picture.

Such a playback method can handle size information of the recording medium as an appropriate data size, and is useful as a playback method with improved random accessibility.

In the determining, the size information may be determined to be a value indicating data size of a section where the picture is recorded based on a first stipulated data size, in a case where the bitrate information indicates a bitrate larger than a predetermined value, and the size information may be determined to be a value indicating data size of a section where the picture is recorded based on a second stipulated data size that is smaller than the first stipulated data size, in a case where the bitrate information indicates a bitrate equal to or smaller than the predetermined value.

Accordingly, in such a playback method, the definition (meaning) of data size of I_end is changed in accordance with the bitrate of the video stream. Thus, such a playback method can appropriately determine the end position of an I picture both when the bitrate indicated by the bitrate information is higher than the predetermined value and equal to or lower than the predetermined value.

The first stipulated data size may be a value allocated every 192×1024×n bytes (where n is a natural number).

The predetermined value may be 48,000,000 bits/second.

The size information may be a 3-bit long value.

A playback device according to an aspect of the present disclosure is a playback device that reads out and plays content from a recording medium in which is recorded a video stream that is encoded video information, map information, and bitrate information of the video stream. The map information includes playback start time information of a picture that is included in the video stream and is independently decodable, start position information indicating a data start position of the picture in the video stream, and size information indicating data size of a section where the picture is recorded in the video stream, based on a predetermined stipulated data size. The stipulated data size differs in accordance with the bitrate information. The playback device includes: a readout unit that reads out the map information and bitrate information; a determining unit that determines the stipulated data size of the size information included in the map information that has been read out, in accordance with the bitrate information that has been read out; an acquisition unit that acquires the picture from the video stream based on the results of determination, and the start position information and the size information included in the map information that has been read out; and a video playback unit that decodes and plays the acquired picture.

Such a playback device can handle size information of the recording medium as an appropriate data size, and is useful as a playback device with improved random accessibility.

These general or specific aspects may be realized by a device, method, system, integrated circuit, computer program, or computer-readable recording medium such as a CD-ROM, and may be realized by any combination of a system, method, integrated circuit, computer program, and recording medium.

Preferred embodiments to carry out the present disclosure will be described below with reference to the attached drawings. It should be noted that the second embodiment is the closest to the disclosure in claim 1 of the present application, the basic configuration of the information recording medium and so forth in the second embedment will be described first by way of the first embodiment, to facilitate understanding.

First Embodiment

First, the basic structure and operations of a BD-ROM and a BD-ROM player that plays BD-ROMs will be described with reference to FIGS. 1 through 30.

Logical Data Structure on Disc

Figure 4:
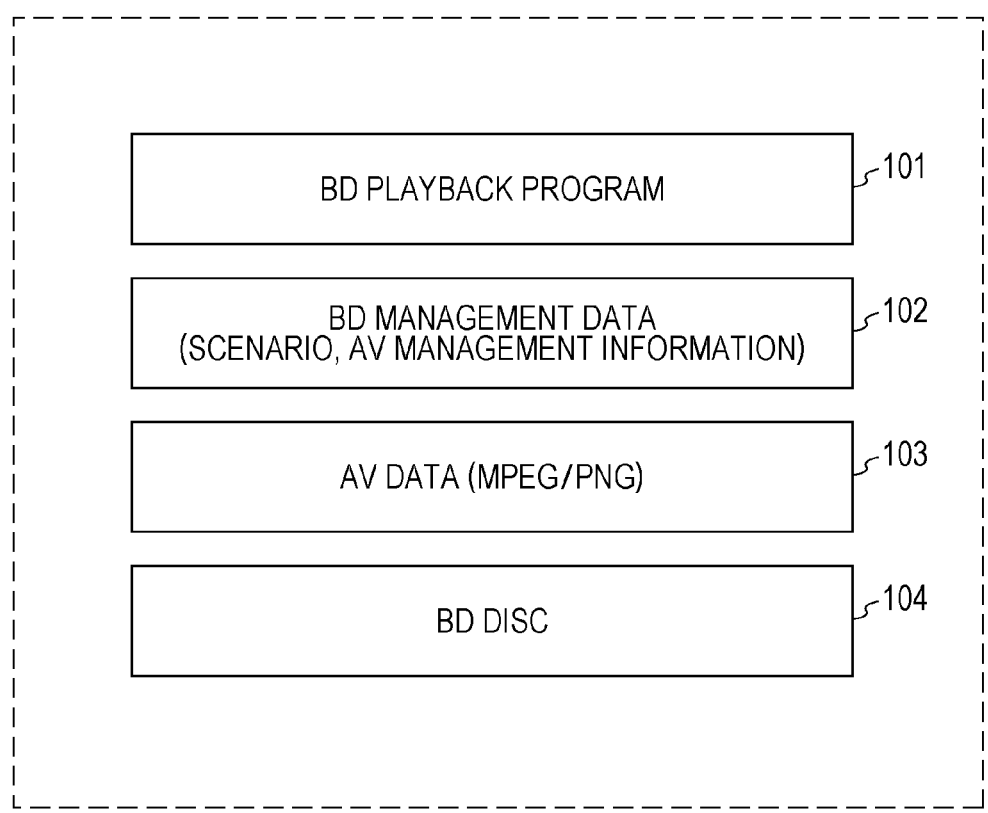
FIG. 4 is a diagram illustrating a data hierarchy of a BD-ROM.

FIG. 4 is a diagram illustrating data hierarchy on a BD-ROM. As illustrated in FIG. 4, there are recorded in a BD-ROM 104 that is a disc medium, AV data 103, BD management information 102 such as management information relating to the AV data, AV playback sequence, and so forth, and a BD playback program 101 that realizes interactivity.

Note that in the present embodiment, description of BD-ROM will be made primarily with regard to an AV application that plays AV contents such as movies, but a BD-ROM can be used as a recording medium for computer use, in the same way as with CR-ROMs and DVD-ROMs, as a matter of course.

Figure 5:
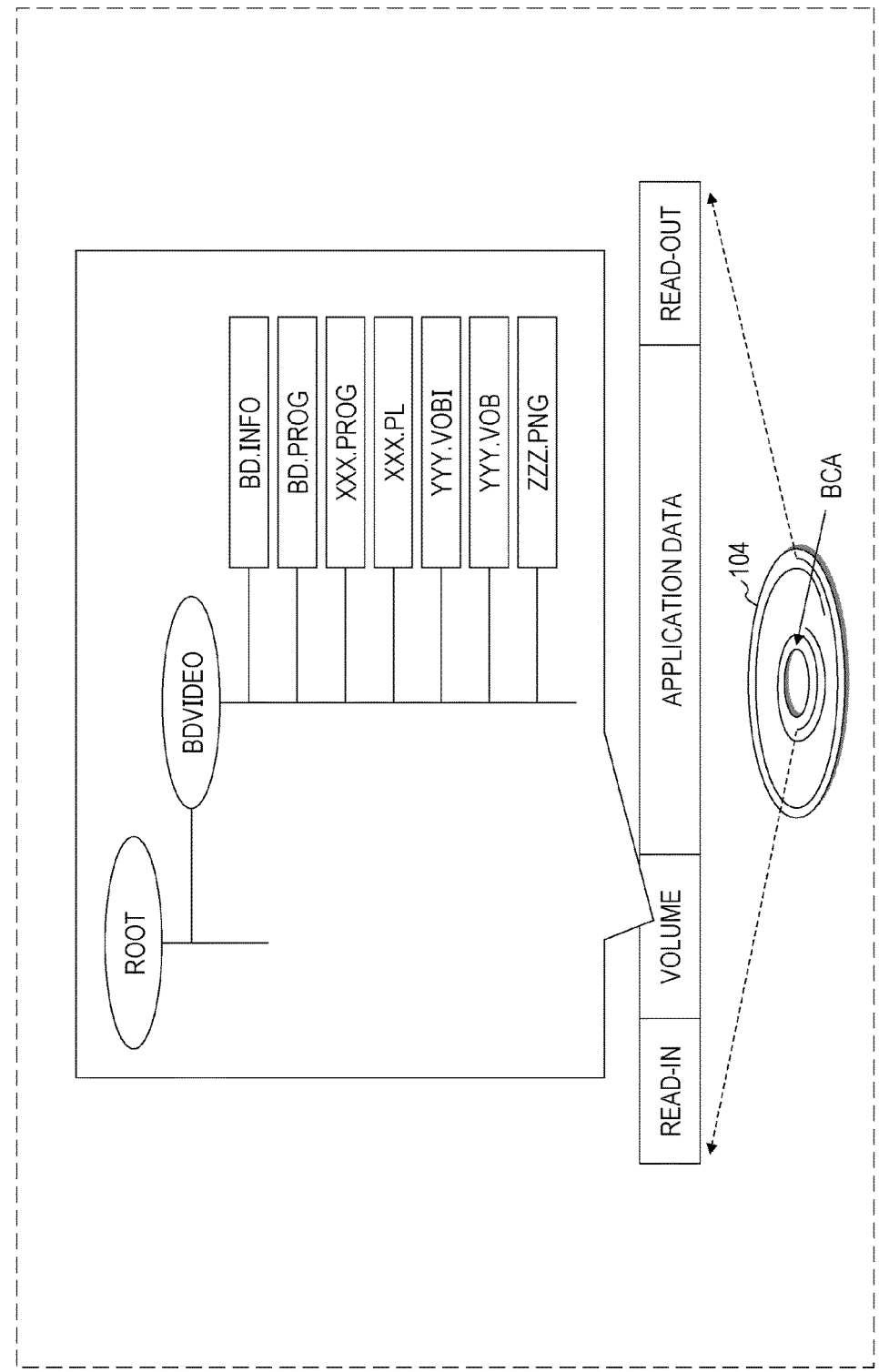
FIG. 5 is a diagram illustrating a structure of logical data recorded in a BD-ROM.

FIG. 5 is a diagram illustrating the structure of logical data recorded on the above BD-ROM 104. The BD-ROM 104 has a recording region in the form of a spiral from the inner perimeter thereof toward the outer perimeter, and has a logical address space where logical data can be recorded, between a read-in at the inner perimeter and a read-out at the outer perimeter, in the same way as with other optical discs, such as DVDs and CDs, for example.

On the inner side of the read-in there is a special region called a Burst Cutting Area (BCA), that can only be read out by the drive. This region is unreadable by applications, and accordingly is often used in copyright protection technology and so forth, for example.

Application data such as video data and the like is recorded the logical address space, with file system information (volume) at the beginning thereof. The file system is the arrangement for managing data stipulated by a standard such as UDF or ISO9660 or the like, as described above in the conventional art. Logical data recorded therein can be read out using the directory and file structure, in the same way as with a normal PC.

In the case of the present embodiment, the directory and file structure on the BD-ROM 104 has a BDVIDEO directory immediately below the root directory (ROOT). This directory is a directory in which data, such as AV data and management information handled by the BD-ROM (the BD playback program 101, BD management information 102, and AV data 103 illustrated in FIG. 4) is recorded.

The following seven types of files are recorded beneath the BDVIDEO directory.

BD.INFO (fixed filename)

This is one of "BD management information", and is a file in which is recorded information relating to the entire BD-ROM. The BD-ROM player reads out this file first.

BD.PROG (fixed filename)

This is one of "BD playback programs", and is a file in which is recorded a program relating to the entire BD-ROM.

XXX.PL ("XXX" is variable, suffix "PL" is fixed)

This is one of "BD management information", and is a file in which is recorded playlist (Play List) information that records a scenario. Each playlist has one file.

XXX.PROG ("XXX" is variable, suffix "PROG" is fixed)

This is one of "BD playback programs", and is a file in which is recorded a program for each aforementioned playlist. The correlation to the playlist is identified by the file body name ("XXX" matches).

YYY.VOB ("YYY" is variable, suffix "VOB" is fixed)

This is one of "AV data", and is a file in which is recorded a VOB (the same as the VOB described in the example of the conventional art). One VOB corresponds to one file.

YYY.VOBI ("YYY" is variable, suffix "VOBI" is fixed)

This is one of "BD management information", and is a file in which is recorded management information relating to the VOB which is AV data. The correlation to the VOB is identified by the file body name ("YYY" matches).

ZZZ.PNG ("ZZZ" is variable, suffix "PNG" is fixed)

This is one of "AV data", and is a file in PNG (an image format standardized by the World Wide Web Consortium (W3C) and is pronounced "ping") which is image data for configuring subtitles and menu screens. One PNG image corresponds to one file.

Player Configuration

Figure 6:
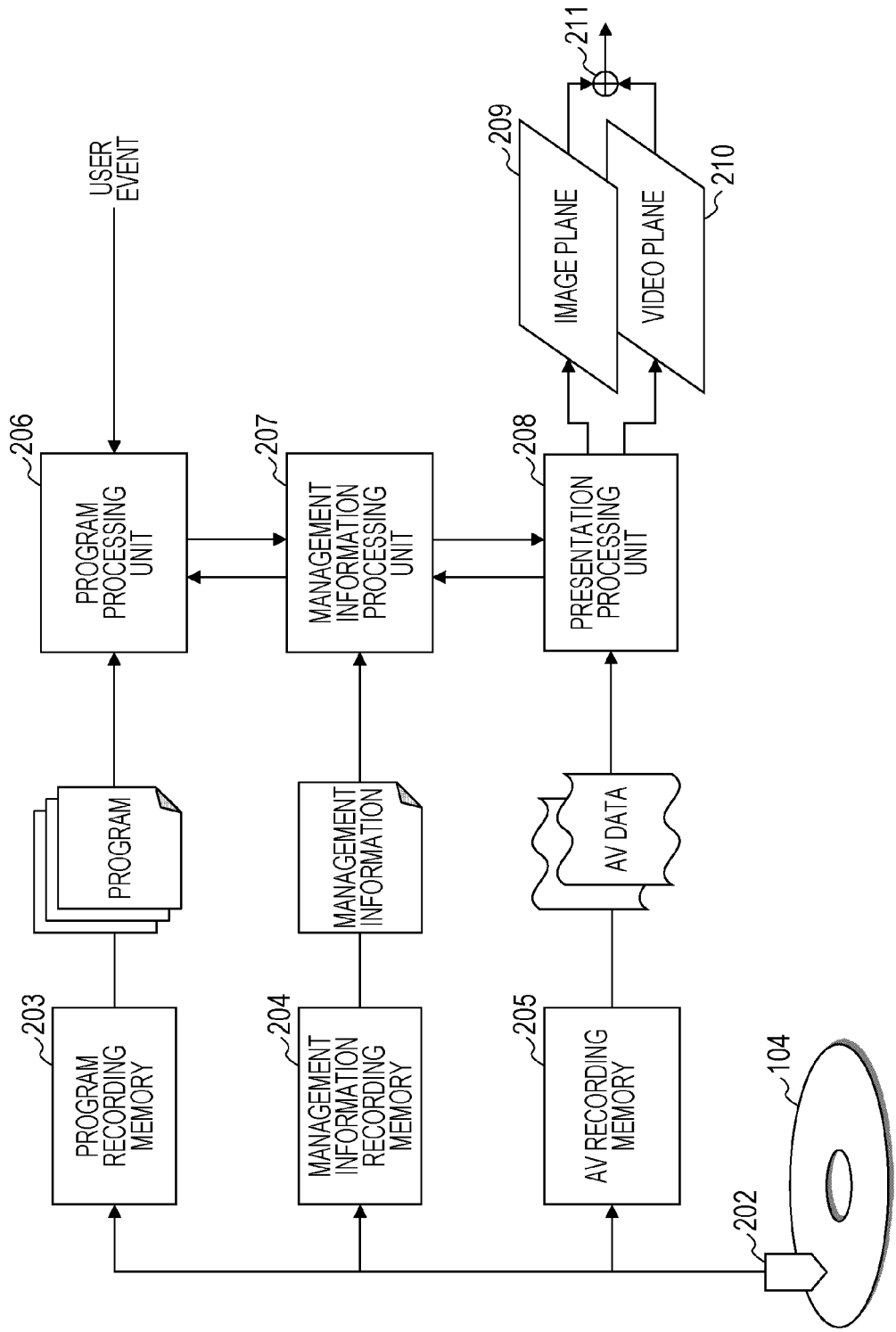
FIG. 6 is a diagram illustrating an overview of a basic configuration of a BD-ROM player that plays BD-ROMs.

Next, the configuration of a player that plays the BD-ROM 104 will be described with reference to FIGS. 6 and 7. FIG. 6 is a schematic diagram illustrating the basic configuration of a BD-ROM player that plays the BD-ROM 104. The BD-ROM player illustrated in FIG. 6 reads out data on the BD-ROM 104 via an optical pickup 202. The data that is read out is stored in dedicated memory in accordance with the type of each data.

The BD playback program ("BD.PROG" or "XXX.PROG" file) is recorded in program recording memory 203, the BD management information ("BD.INFO", "XXX.PL", or "YYY.VOBI" file) in management information recording memory 204, and AV data ("YYY.VOB" or "ZZZ.PNG" file) in AV recording memory 205, respectively.

The BD playback program recorded in the program recording memory 203 is processed by a program processing unit 206. The BD management information recorded in the management information recording memory 204 is processed by a management information processing unit 207. Also, the AV data recorded in the AV recording memory 205 is processed by a presentation processing unit 208.

The program processing unit 206 receives information of a playlist to be played from and event information such as the timing to execute a program from the management information processing unit 207, and performs processing of the program. The playlist to play can be dynamically changed at the program, and this can be realized by sending a play command of the playlist after changing to the management information processing unit 207.

The program processing unit 206 further accepts events from the user, such as requests from a remote controller that the user operates for example, and in a case where there is a program corresponding to the user event, executes the processing.

The management information processing unit 207 receives instructions from the program processing unit 206 and analyzes a playlist corresponding to that instruction and the management information of a VOB corresponding to that playlist. Further, instructions of AV data to be played are given to the presentation processing unit 208.

The management information processing unit 207 also receives reference time information from the presentation processing unit 208, and performs stopping instruction of the AV data playback to the presentation processing unit 208 based on the time information. Further, an event is generated indicating the program executing timing as to the program processing unit 206.

The presentation processing unit 208 has decoders corresponding to each data of video, audio, and subtitles, and decodes and outputs AV data in accordance with instructions from the management information processing unit 207. The video data and subtitle data is drawn on respective dedicated planes after decoding.

Specifically, the video data is drawn on a video plane 210, and image data such as subtitle data is drawn on an image plane 209, further, compositing processing of the video drawn on the two planes is performed by a compositing processing unit 211 and output to a display device such as a television (TV) or the like.

The BD-ROM player has a configuration based on the data structure recorded in the BD-ROM 104 illustrated in FIG. 4, as illustrated in FIG. 6. FIG. 7 is a block diagram detailing the configuration of the player illustrated in FIG. 6. The correlation of the components illustrated in FIG. 6 and the components illustrated in FIG. 7 is as follows.

The AV recording memory 205 corresponds to image memory 308 and a track buffer 309. The program processing unit 206 corresponds to a program processor 302 and a UO (User Operation) manager 303.

The management information processing unit 207 corresponds to a scenario processor 305 and a presentation controller 306. The presentation processing unit 208 corresponds to a clock 307, a demultiplexer 310, an image processor 311, a video processor 312, and a sound processor 313.

The VOB data (MPEG stream) read out from the BD-ROM 104 is recorded in the track buffer 309, and the image data (PNG) in the image memory 308.

The demultiplexer 310 extracts VOB data recorded in the track buffer 309, based on the time obtained from the clock 307. Further, video data included in the VOB data is sent to the video processor 312, and the audio data to the sound processor 313.

The video processor 312 and sound processor 313 each are configured including a decoder buffer and a decoder, as stipulated by the MPEG system standard. That is to say, the data of each of the video and audio sent from the demultiplexer 310 is temporarily recorded in the respective decoder buffers, and subjected to decoding processing at the respective decoders following the clock 307.

There are the following two processing methods for the PNG data recorded in the image memory 308. In a case where the PNG data is for subtitles, the decoding timing is instructed by the presentation controller 306. The scenario processor 305 first receives the time information from the clock 307, and instructs the presentation controller 306 to display or not display subtitles when the subtitle display time (starting and ending) arrives, so that appropriate subtitle display can be performed.

The image processor 311 which has received a decode/display instruction from the presentation controller 306 extracts the corresponding PNG data from the image memory 308, decodes, and draws on the image plane 209.

Also, in a case where the PNG data is for a menu screen, the decoding timing is instructed by the program processor 302. When the program processor 302 instructs decoding of the image is dependent on the BD program that the program processor 302 is processing, and accordingly is not always the same.

The image data and video data is drawn on the image plane 209 and video plane 210 after the respective decoding described in FIG. 6, and composited and output by the compositing processing unit 211.

The management information read out from the BD-ROM 104 (scenario and AV management information) is recorded in the management information recording memory 204, but the scenario information ("BD.INFO" and "XXX.PL") is read out and processed by the scenario processor 305. Also, the AV management information ("YYY.VOBI") is read out and processed by the presentation controller 306.

The scenario processor 305 analyzes the playlist information, instructs the presentation controller 306 of the VOB referenced by the playlist and the playback position thereof. The presentation controller 306 analyzes the management information ("YYY.VOBI") of the VOB to be handled, and instructs a drive controller 317 to read out the VOB to be handled.

The drive controller 317 follows the instructions of the presentation controller 306 to move the optical pickup 202, and read out the AV data to e handled. The AV data that has been read out is recorded in the image memory 308 or track buffer 309, as described earlier.

The scenario processor 305 monitors the time of the clock 307, and hands the event to the program processor 302 at the timing set in the management information.

The BD program recorded in the program recording memory 203 ("BD.PROG" or "XXX.PROG") is executed by the program processor 302. The program processor 302 processes a BD program in a case where an event has been sent from the scenario processor 305 or a case where an event has been sent from the UO manager 303. In a case where a request has been sent from the user by a remote controller key, the UO manager 303 generates an event corresponding to this request, and sends to the program processor 302. Playback of a BD-ROM is performed by the operations of the components as described above.

Application Space

Figure 8:
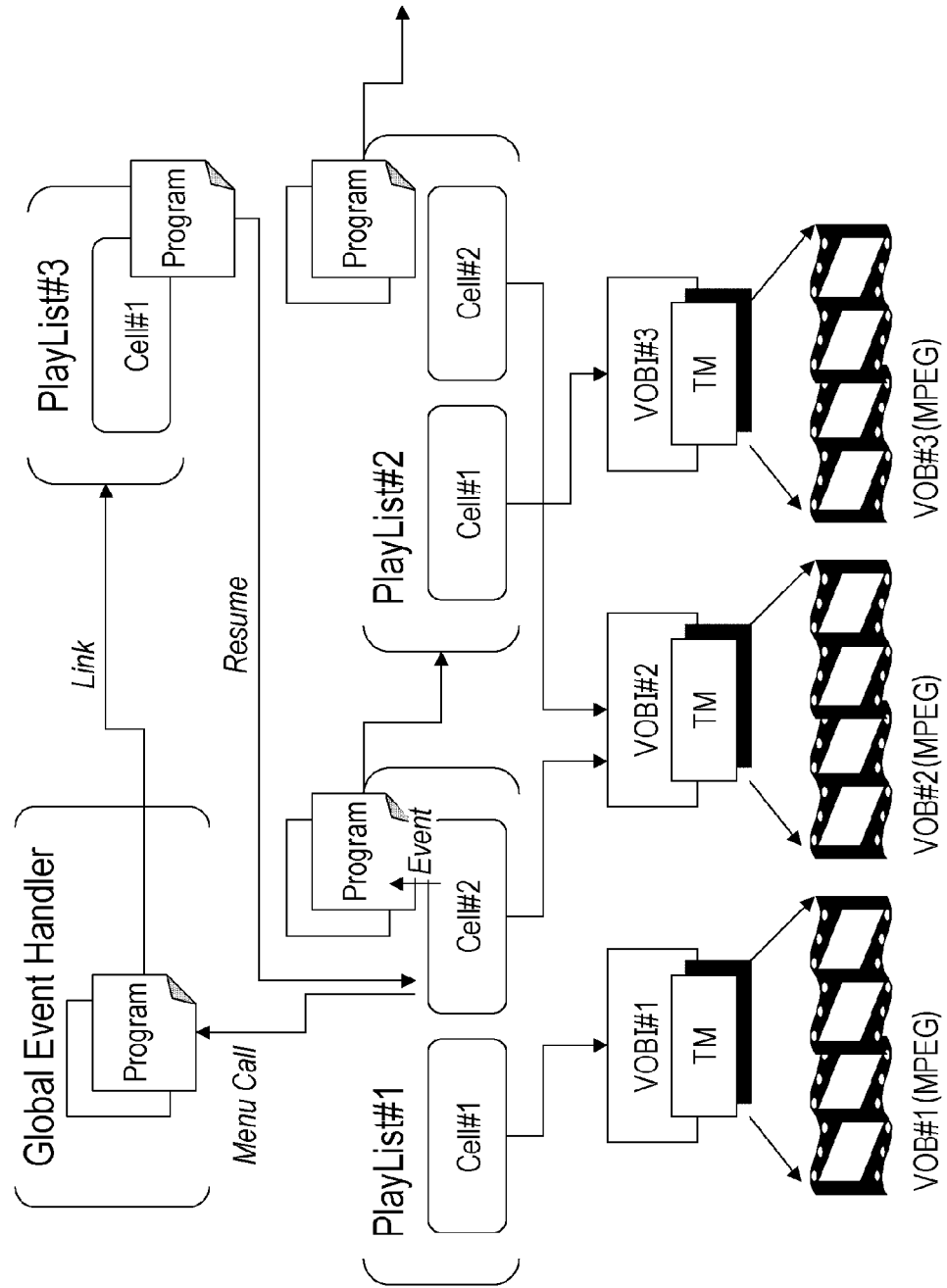
FIG. 8 is a diagram illustrating application space of a BD-ROM.

FIG. 8 is a diagram illustrating application space of a BD-ROM. In the application space of a BD-ROM, a playlist (PlayList) is one playback unit. A playlist has a static scenario that is made up of a playback sequence of cells (Cell), and a dynamic scenario described by a program. As long as there is no dynamic scenario according to a program, the playlist is simply playing the individual cells in order, and playback of the playlist ends at the point that playback of all cells has ended.

On the other hand, a program is capable of describing playback beyond the playlist, and dynamically changing the object of playback in accordion with user selections or the state of the player. A typical example is dynamic change of the object of playback made via the menus screen. In the case of a BD-ROM, a menu is a scenario played by user selection, i.e., one component of a function to dynamically select a playlist.

The term program as used here means an event handler executed by a time-based event or a user event. A time-based event is an event generated based on time information embedded in the playlist. An event sent from the scenario processor 305 to the program processor 302 as described in FIG. 7 corresponds to this. Upon a time-based event being issued, the program processor 302 process execution of an event handler correlated by ID.

As described earlier, a program to be executed may instruct playback of another playlist, and in this case, the playback of the playlist currently being played is canceled, and transitions to playback of the specified playlist.

A user event is an event generated by operations of remote controller keys by the user. There are two general types of user events. A first is an event of selecting a menu generated by operations of cursor keys ("up", "down", "left", and "right" keys) and an "OK" key that the remote controller has.

The event handler corresponding to the event of menu selection is only valid for restricted time within the playlist. That is to say, validity periods are set for each of the event handles, as playlist information. The program processor 302 searches for a valid event handler when an "up", "down", "left", "right", or "OK" key has been pressed, and in a case where there is a valid event handler, the event handler is executed. Otherwise, the event of menu selection is ignored.

The second user event is an event for calling up a menu screen generated by operation of a "menu" key. Upon a menu screen call-up event being generated, a global event handler is called.

A global event handler is an event handler that is not dependent on any playlist, and is constantly valid. Using this function enables a DVD menu call to be implemented. Implementing a menu call enables audio and subtitle menus and so forth to be called up during playback of a title, and to execute playback of the title from the paused point where the audio or subtitles was changed.

A cell (Cell), which is a unit making up a static scenario in the playlist, is a reference to all or part of a playback section of a VOB (MPEG stream). A cell has information of starting and ending time of the playback section within the VOB. VOB management information (VOBI), that is paired with each VOB, has a time map (Time Map or TM) therein, and can find the readout start address and end address for the playback and end time of the VOB within the VOB (i.e., within the object file "YYY.VOB") described by this time map. Details of the time map will be described later with reference to FIG. 14.

Details of VOB

Figure 9:
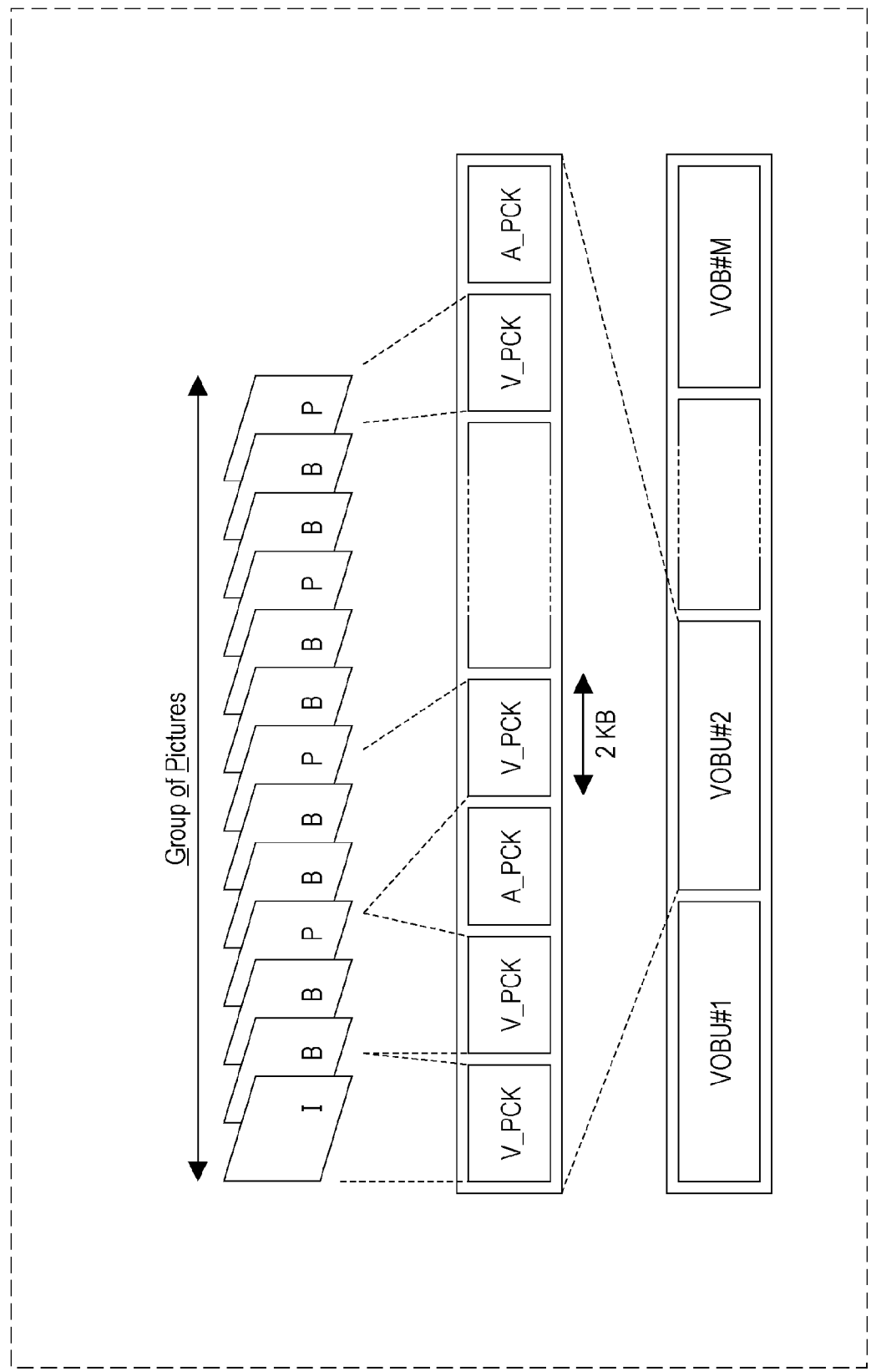
FIG. 9 is a diagram illustrating the configuration of an MPEG stream (VOB)

FIG. 9 is a diagram illustrating the configuration of an MPEG stream (VOB) used in the present embodiment. As illustrated in FIG. 9, a VOB is made up of multiple Video Object Units (VOBU). A VOBU is a unit based on a Group Of Pictures (GOP) in a MPEG video stream, and is one playback unit in a multiplexed stream including audio data.

A VOBU has playback time of 0.4 seconds to 1.0 seconds, and normally has playback time of 0.5 seconds. This is due to the MPEG GOP structure normally being 15 frames/second (in the case of NTSC).

A VOBU has a video pack (V_PCK) that is video data and an audio pack (A_PCK) that is audio data therein. Each pack is configured of 1 sector, and in the case of the present embodiment is configured in 2 kB units.

Figure 10:
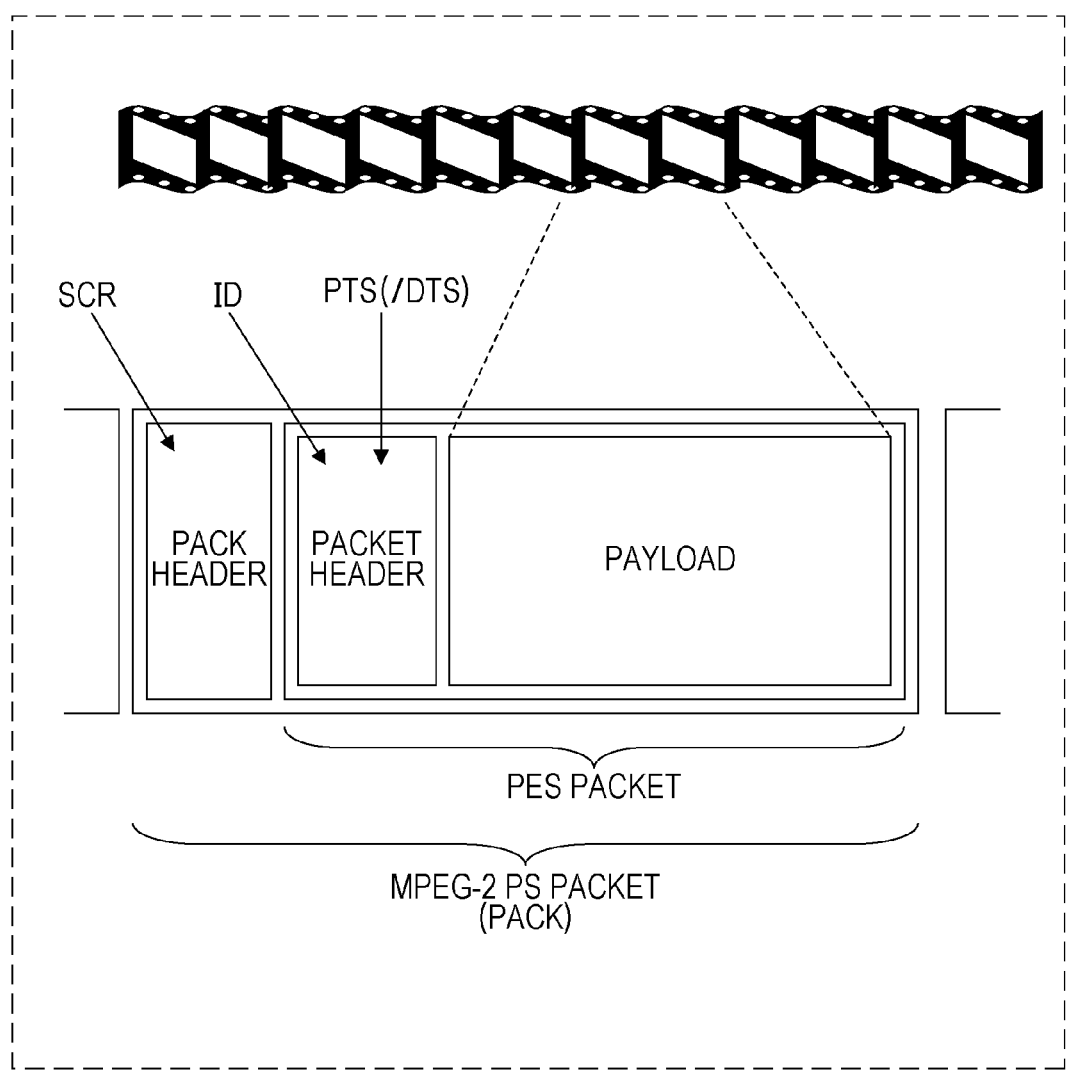
FIG. 10 is a diagram illustrating the configuration of packs in an MPEG stream.

FIG. 10 is a diagram illustrating the configuration of a pack in an MPEG stream. Elementary data such as video data and audio data are sequentially input from the beginning of a data storage region in a packet, called a payload, as illustrated in FIG. 10. A packet header is attached to a payload, making up one packet.

Recorded in the packet data is an ID (stream_id) for identifying which stream the data stored the payload belongs to, whether video data or audio data, and in a case there are multiple streams worth of video data or audio data, which stream the data belongs to, and a Decode Time Stamp (DTS) and Presentation Time Stamp (PTS) that are timestamps for the decoding and displaying time information of this payload.

Not all packet headers necessarily have a DTS and PTS recorded; rules for recording are stipulated in MPEG. Details of the rules are laid forth in the MPEG system (ISO/IEC13818-1) Standard, and accordingly will be omitted here.

Figure 11:
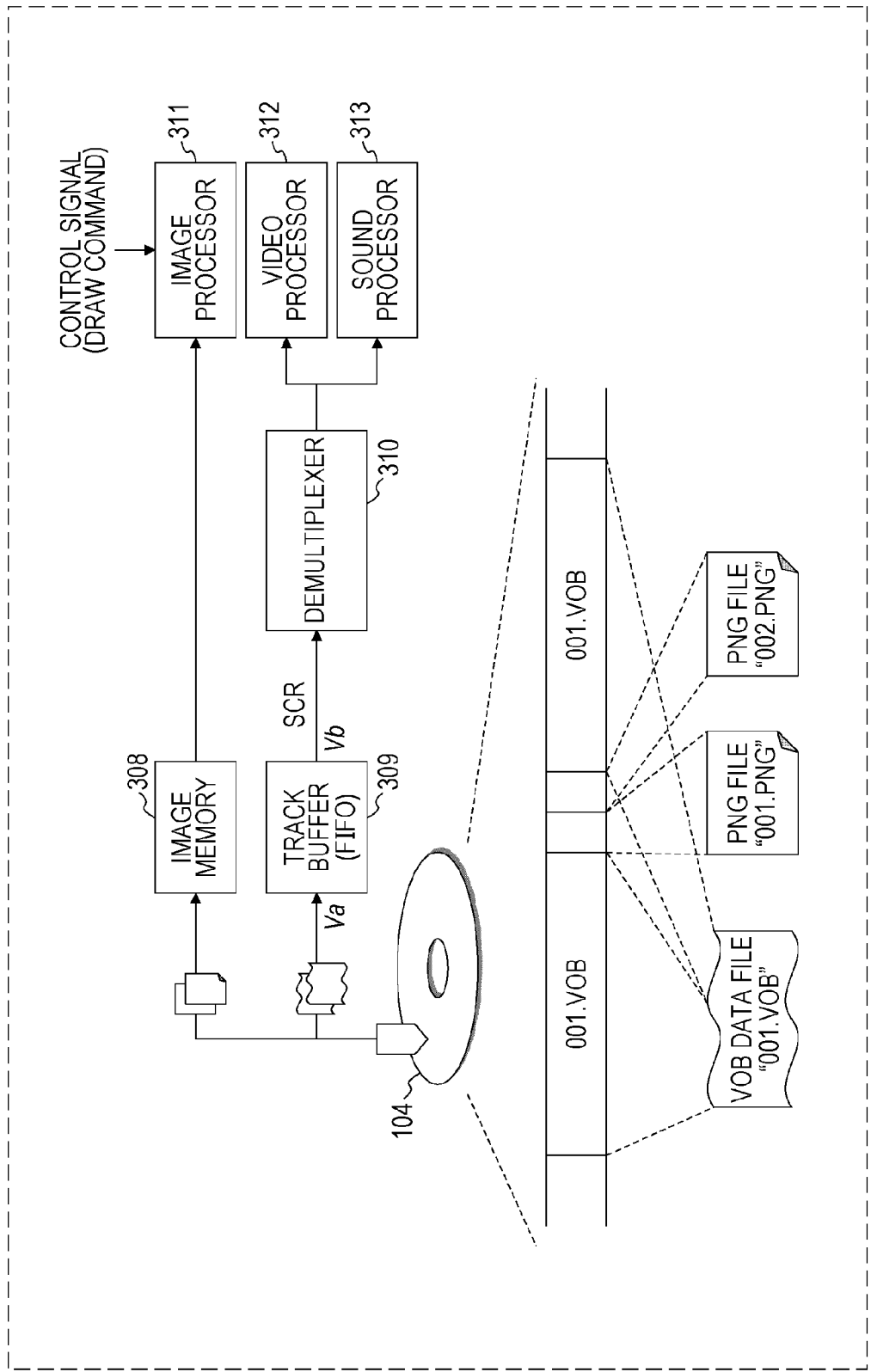
FIG. 11 is a diagram for describing the relationship between AV data and player configuration.

A header (pack header) is further added to the packet, thereby making up a pack. The pack header has recorded therein a System Clock Reference (SCR) that is a timestamp indicating when this pack passes through the demultiplexer 310 and is to be input to decoder buffers of the individual elementary streams. Interleaved Recording of VOB Interleaved recorded of VOB files will be described with reference to FIGS. 11 and 12. FIG. 11 is a diagram for describing the relationship between the AV data and the configuration of a BD-ROM player. Illustrated to the upper side of FIG. 11 is part of the player configuration diagram described above with reference to FIG. 7. The data in the BD-ROM is passes through the optical pickup 202 and is input to the track buffer 309 if a VOB, i.e., an MPEG stream, and input to the image memory 308 if a PNG, i.e., image data.

The track buffer 309 is a First-In First-Out (FIFO), with input VOB data being sent to the demultiplexer 310 in the order in which it was input. At this time, the individual packs are extracted from the track buffer 309 according to the aforementioned SCR, and data is delivered to the video processor 312 or sound processor 313 via the demultiplexer 310.

Figure 7:
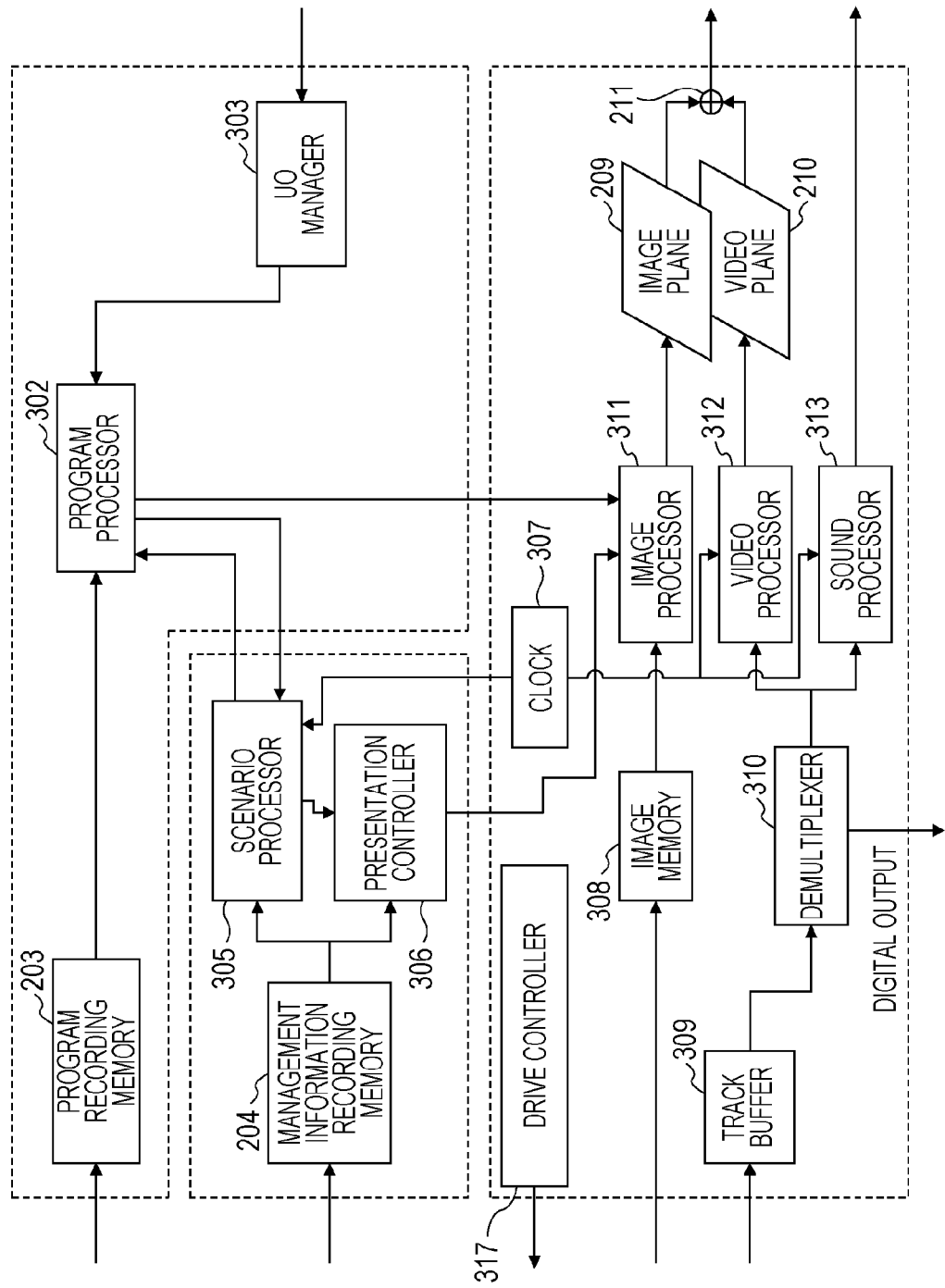
FIG. 7 is a block diagram where the configuration of the player illustrated in FIG. 6 is detailed.

On the other hand, In a case of image data, which image to draw is instructed by the presentation controller 306 (see FIG. 7). The image data used for drawing is deleted from the image memory 308 at the same time if image data for subtitles, but is retained in the image memory 308 if image data for a menu. This is because drawing of the menu is dependent on user operations, so there is the possibility that the same image will be drawn multiple times.

Illustrated to the lower side of FIG. 11 is interleaved recording of a VOB file and PNG files on the BD-ROM. Generally, in the case of a CD-ROM or DVD-ROM for example, AV data that is a series of continuous playing units is recorded continuously. As long as the data is recorded continuously, all the drive has to do is to sequentially read out the data and deliver it to the player side.

However, in a case where the AV data to be continuously play is fragmented and dispersed across the disc, seek operations are interposed between the individual continuous sections, and data readout stops during this time. That is to say, supply of data may stop.

In the same way, recording of a VOB file in a continuous region is desirable for BD-ROMs as well, but there is data such as subtitle data for example, that is to be played synchronously with the video data in the VOB, so the subtitle data needs to be read out from the BD-ROM in one way or another.

One way of reading out subtitle data is to read out all subtitle image data (PNG file) before starting playback of the VOB. However in this case, a great amount of memory is necessary to use for temporary recording, so this is not realistic. Accordingly, a method where a VOB file is divided into several blocks, and the VOB file and image are subjected to interleaved recording is employed with the present embodiment.

Illustrated to the lower side of FIG. 11 is interleaved recording. By suitably performing interleaved placement of the VOB file and image data, image data can be stored in the image memory 308 at a necessary timing, without the great amount of temporary recording memory described above. However, while the image data is being read out, readout of VOB data stops, as a matter of course.

Figure 12:
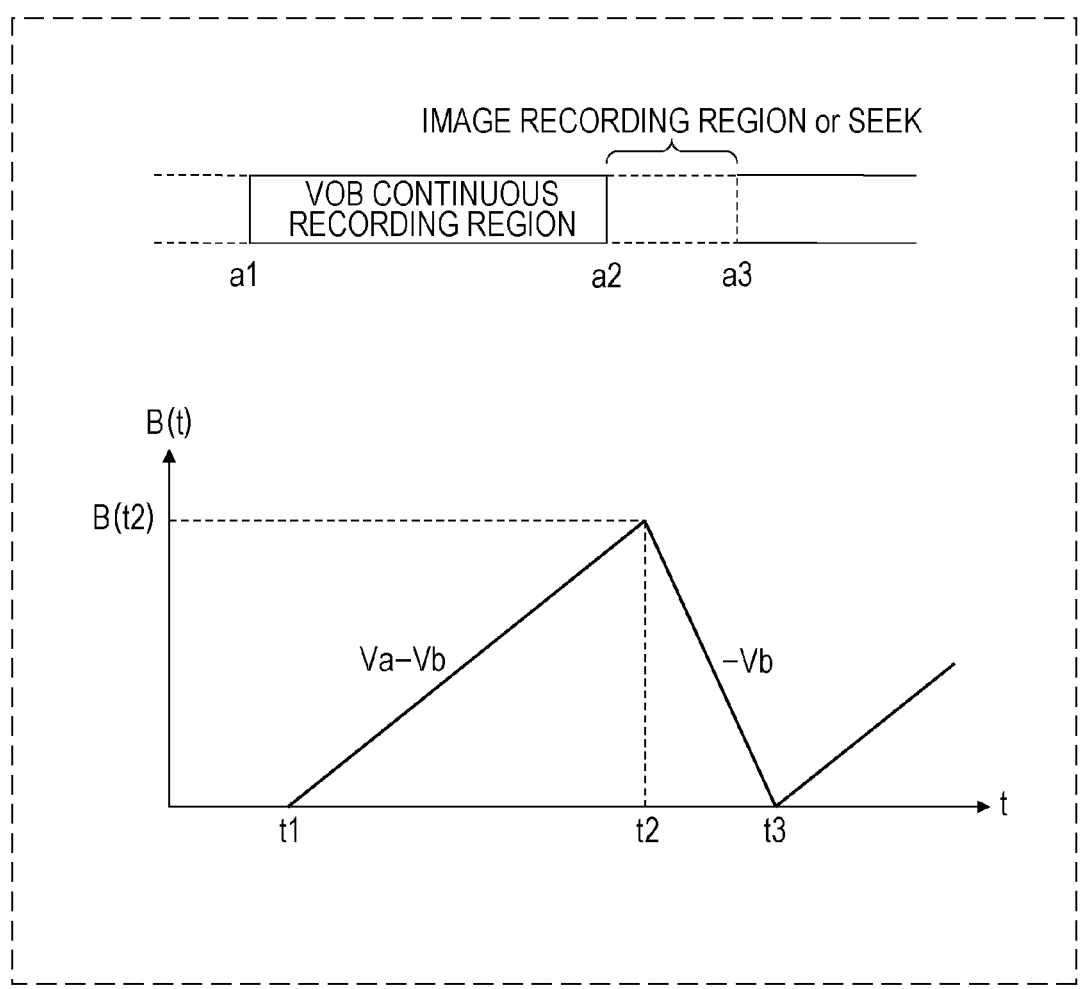
FIG. 12 is a diagram for describing a VOB data continuous supply model using a track buffer.

FIG. 12 is a diagram for describing a VOB data continuous supply model using the track buffer 309, to solve the above problem in interleaved recording. As described earlier, VOB data is temporarily stored in the track buffer 309. Setting the data input rate to the track buffer 309 to be higher than the data output rate from the track buffer 309 means that the amount of data sorted in the track buffer 309 continues to increase, as long as data is being read out from the BD-ROM.

Now, the input rate to the track buffer 309 is denoted by Va, and the output rate from the track buffer 309 is denoted by Vb. The continuous recording region of the VOB continues from "a1" to "a2" as illustrated to the upper side of FIG. 12. From "a2" to "a3" is a section where image data is recorded, so VOB data cannot be read out.

Illustrated to the lower side of in FIG. 12 is the stored amount in the track buffer 309. The horizontal axis represents time, and the vertical axis represents the amount of data sorted inside the track buffer 309. The time "t1" indicates the time at which readout of the continuous recording region of the VOB "a1" has started.

After this time, data will be accumulated in the track buffer 309 at a rate of Va-Vb. It is needless to say that this is the difference in the input/output rates of the track buffer 309. Time "t2" is the time to read in data at "a2", and is the end point of one continuous recording region.

That is to say, the amount of data in the track buffer 309 increases at the rate of Va-Vb from "t1" to "t2", and the data accumulation amount B(t2) at the time "t2" can be calculated by the following Expression (1).

$$B(t2)=(Va-Vb) \times (t2-t1) \qquad \text{Expression (1)}$$

Thereafter, image data continues until the address "a3" on the BD-ROM, so input to the track buffer 309 is 0, and the amount of data within the track buffer 309 decreases at an output rate "−Vb". This reduction in data amount continues until the readout position "a3", i.e., until the time "t3".

What is important here is that once the data amount stored in the track buffer 309 before time "t3" reaches 0, there is no more VOB data to supply to the decoder, so playback of the VOB will stop. However, in a case where the is data remaining in the track buffer 309 at time "t3", this means that playback of the VOB can be continued without stopping.

The conditions for the VOB playback to be continuously performed without stopping can be expressed by the following Expression (2).

$$B(t2) \geq -Vb \times (t3-t2) \qquad \text{Expression (2)}$$

That is to say, the array of image data should be decided so as to satisfy Expression (2).

Navigation Data Structure

Figure 13:
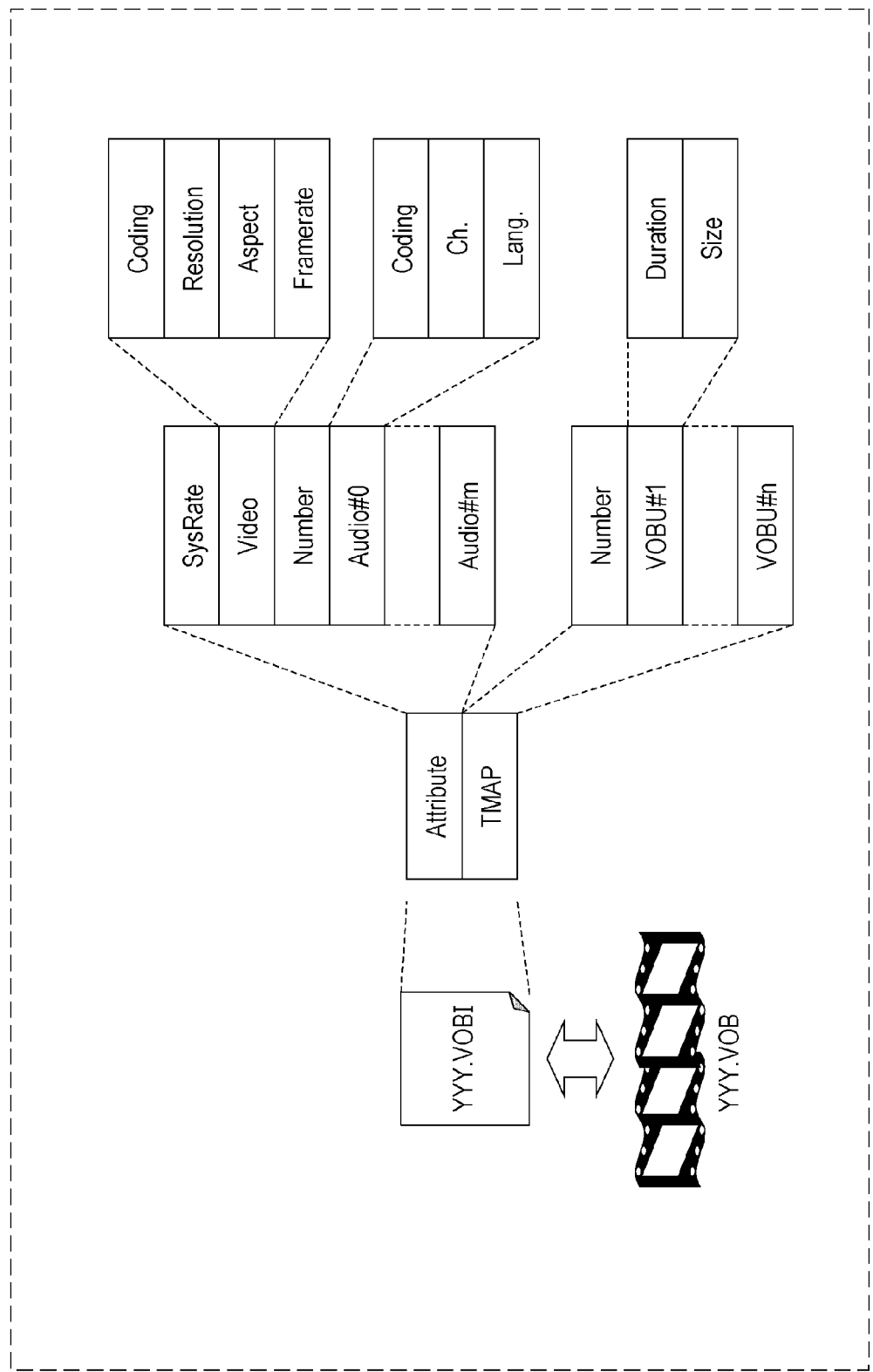
FIG. 13 is a diagram illustrating the internal structure of a VOB management information file.

The structure of navigation data (BD management information) recorded in the BD-ROM will be described with reference to FIGS. 13 through 19. FIG. 13 is a diagram illustrating the internal structure of a VOB management information file ("YYY.VOBI").

The VOB management information has stream attribute information (Attribute) and a time map (TMAP) of this VOB. The stream attribute information is of a configuration having video attributes (Video) and audio attributes (Audio#0 through Audio#m) individually. Particularly, in the case of an audio stream, the VOB can have multiple audio streams at the same time, so the number of data fields of the audio attributes is identified by the number of audio streams (Number).

The following is an example of fields that the video attributes (Video) have, and values which each can have.
Compression format (Coding):
MPEG1
MPEG2
MPEG4
Resolution (Resolution):
1920×1080
1280×720
720×480
720×565
Aspect ratio (Aspect):
4:3
16:9
Frame rate (Framerate):
60
59.94
50
30
29.97
25
24

The following are example of fields that the audio attributes (Audio) have, and values which each can have.
Compression format (Coding):
AC3
MPEG1
MPEG2
LPCM
Number of channels (Ch):
1 to 8
Language attributes (Language):
JPN, ENG, . . . .

The time map (TMAP) is a table having information for each VOBU, and holds the number of VOBUs (Number) that the VOB has, and each VOBU information (VOBU#1 through VOBU#n). Each VOBU information has a playtime length (Duration) of the VOBU and data size (Size) of the VOBU.

Figure 14:
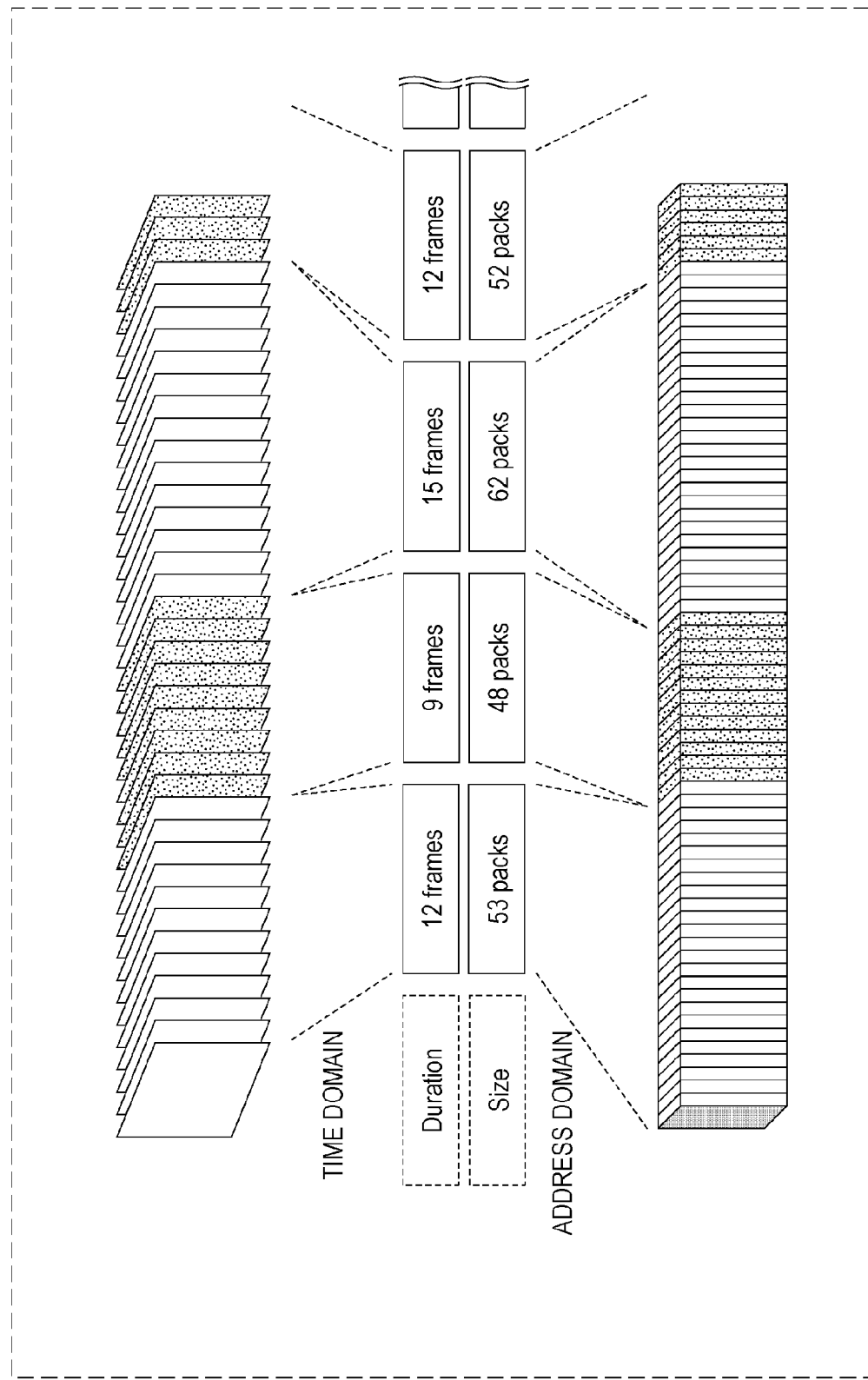
FIG. 14 is a diagram for describing the details of VOBU information.

FIG. 14 is a diagram for describing the details of VOBU information. It is widely known that the MPEG stream has aspects regarding two physical amounts, a temporal aspect and a data-size aspect. For example, Audio Code number 3 (AC3) that is an audio compression standard performs compression at a fixed bitrate, so the relationship between time and address can be obtained by a primary expression.

However, in the case of MPEG video data, each frame has a fixed display time such as 1/29.97 seconds in the case of NTSC for example, but the data size of each frame after compression will vary greatly depending on the picture properties and the picture type used in compression, which are the so-called I/P/B pictures.

Accordingly, it is impossible to express the relationship between time and address by a common expression in the case of MPEG video. As a matter of course, it is impossible to express the relationship between time and address by a common expression, with regard to an MPEG stream where MPEG video data has been multiplexed, i.e., a VOB, as well.

Instead, the relationship between time and address within the VOB is associated by a time map (TMAP). A table which has the number of frames in each VOBU and the number of packs in the VOBU as entries is the time map (TMAP), as illustrated in FIG. 14.

Figure 15:
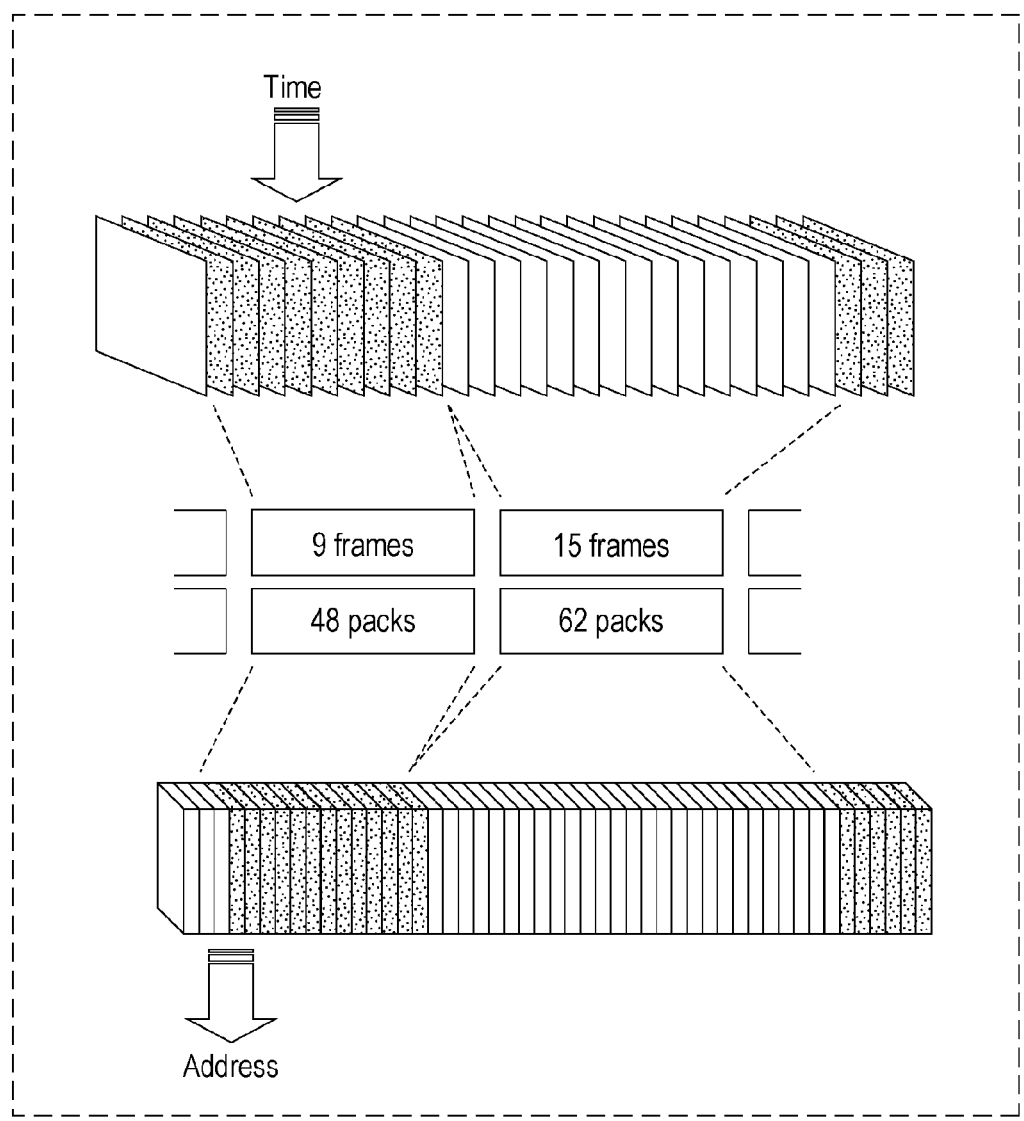
FIG. 15 is a diagram for describing an address information acquisition method using a time map.

How to use a time map (TMAP) will be described with reference to FIG. 15. FIG. 15 is a diagram for describing an address acquisition method using a time map. In a case where time information (Time) is provided, as illustrated in FIG. 15, first, to which VOBU that time belongs is searched for. Specifically, the number of frames is added for each VOBU in the time map, and the VOBU where the sum of the number of frames exceeds or matches the value obtained by converting this time into the number of frames is the VOBU that corresponds to this time.

Next, the size for each VOBU in the time map are added up to the VOBU immediately preceding this VOBU, and that values is the beginning address (Address) of the pack to be read out to play the frame including the time that has been given. Accordingly, an address corresponding to given time information can be obtained in an MPEG stream.

Figure 16:
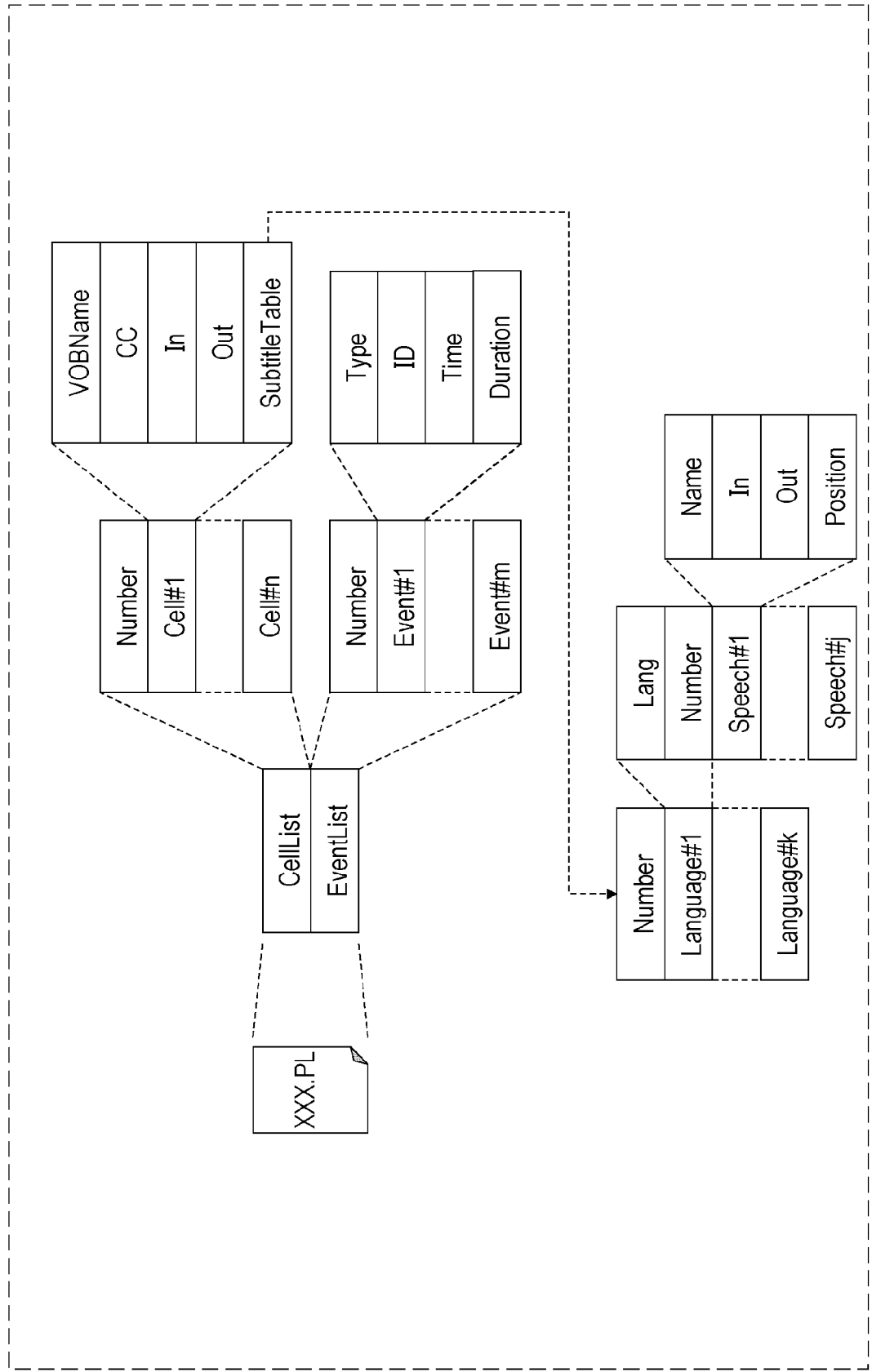
FIG. 16 is a diagram illustrating the configuration of a playlist.

Next, the internal structure of the playlist ("XXX.PL") will be described with reference to FIG. 16. FIG. 16 is a diagram illustrating the configuration of a playlist. A playlist is made up of a cell list (CellList) and event list (EventList).

A cell list (CellList) is information indicating the playback cell sequence within the playlist, and cells are played in the order of description in this list. The content of a cell list (CellList) is the number of cells (Number) and information of each cell (Cell#1 through Cell#n).

The information of each cell (Cell#1 through Cell#n) has the VOB filename (VOBName), the valid section start time (In) and valid section end time (Out) in this VOB, and a subtitle table (SubtitleTable). The valid section start time (In) and valid section end time (Out) are each expressed by frame No. within this VOB, and the address for VOB data necessary for playback can be obtained by using the above-described time map (TMAP).

The subtitle table (SubtitleTable) is a table having subtitle information that is synchronously played with this VOB. The subtitles may have multiple languages, in the same way as with the audio. The subtitle table (SubtitleTable) is made up of the number of languages (Number) and a subsequent table for each language (Language#1 through Language#k).

The table for each language (Language#1 through Language#k) is made up of language information (Language), the number of pieces of subtitle information of the subtitles to be displayed (Number) The subtitle information of the subtitles to be displayed (Speech#1 through Speech#j). Each subtitle information (Speech#1 through Speech#j) is made up of a corresponding image data filename (Name), subtitle display start time (In) and subtitle display end time (Out), and subtitle display position (Position).

The event list (EventList) is a table defining events occurring within this playlist. The event list is made up of the number of events (Number), and following this the individual events (Event#1 through Event#m), each event (Event#1 through Event#m) being made up of event type (Type), event ID (ID), event generation time (Time), and valid period (Duration).

Figure 17:
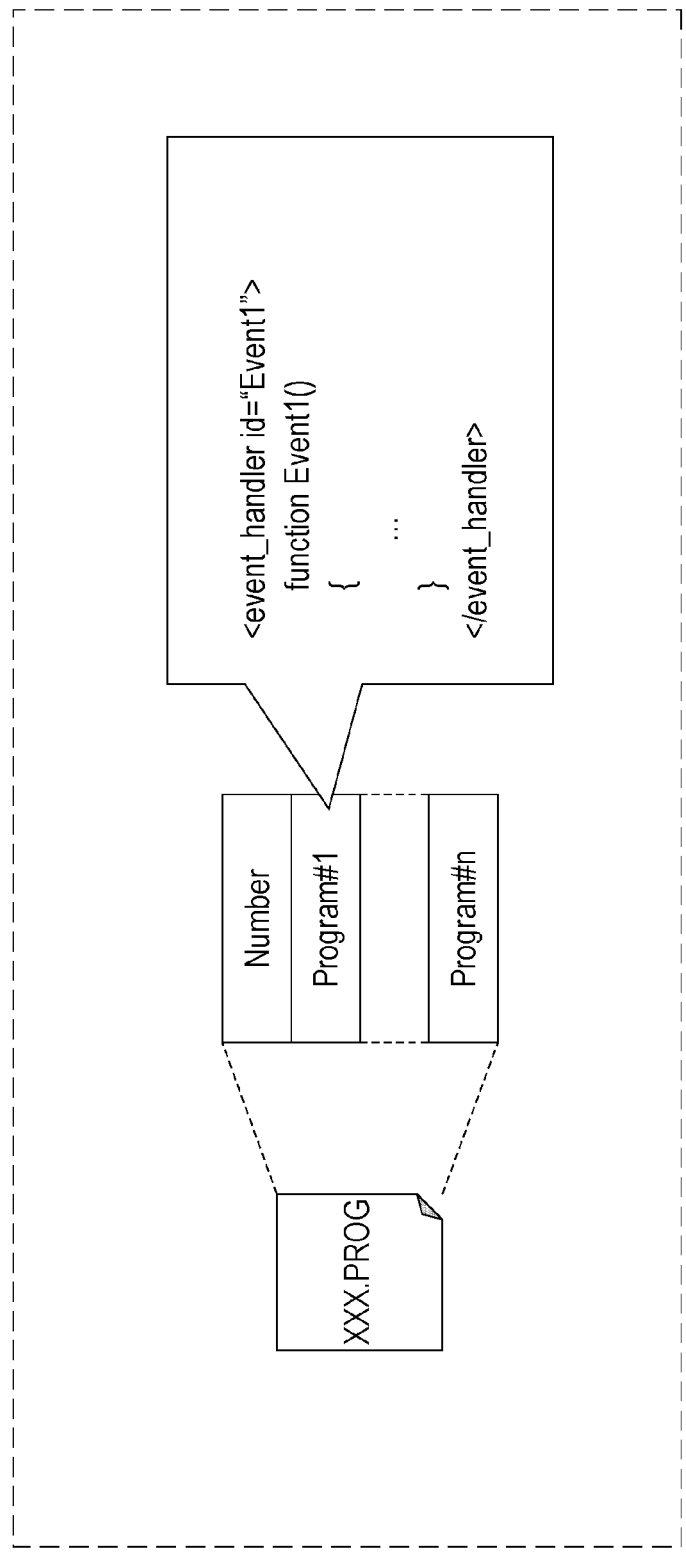
FIG. 17 is a diagram illustrating the configuration of an event handler table.

FIG. 17 is a diagram illustrating the configuration of an event handler table ("XXX.PROG") that has an event handler (time-based events, and user events for menu selection), for each playlist. The event handler table contains the number of event handlers/programs that are defined (Number), and individual event handlers/programs (Program#1 through Program#n).

The description within each of the event handlers/programs (Program#1 through Program#n) contains a definition of the start the event handler (an <event_handler> tag) and an event handler ID (event handler id) that is paired with the aforementioned event ID. Following this, the program is described between brackets { } after "function".

Figure 18:
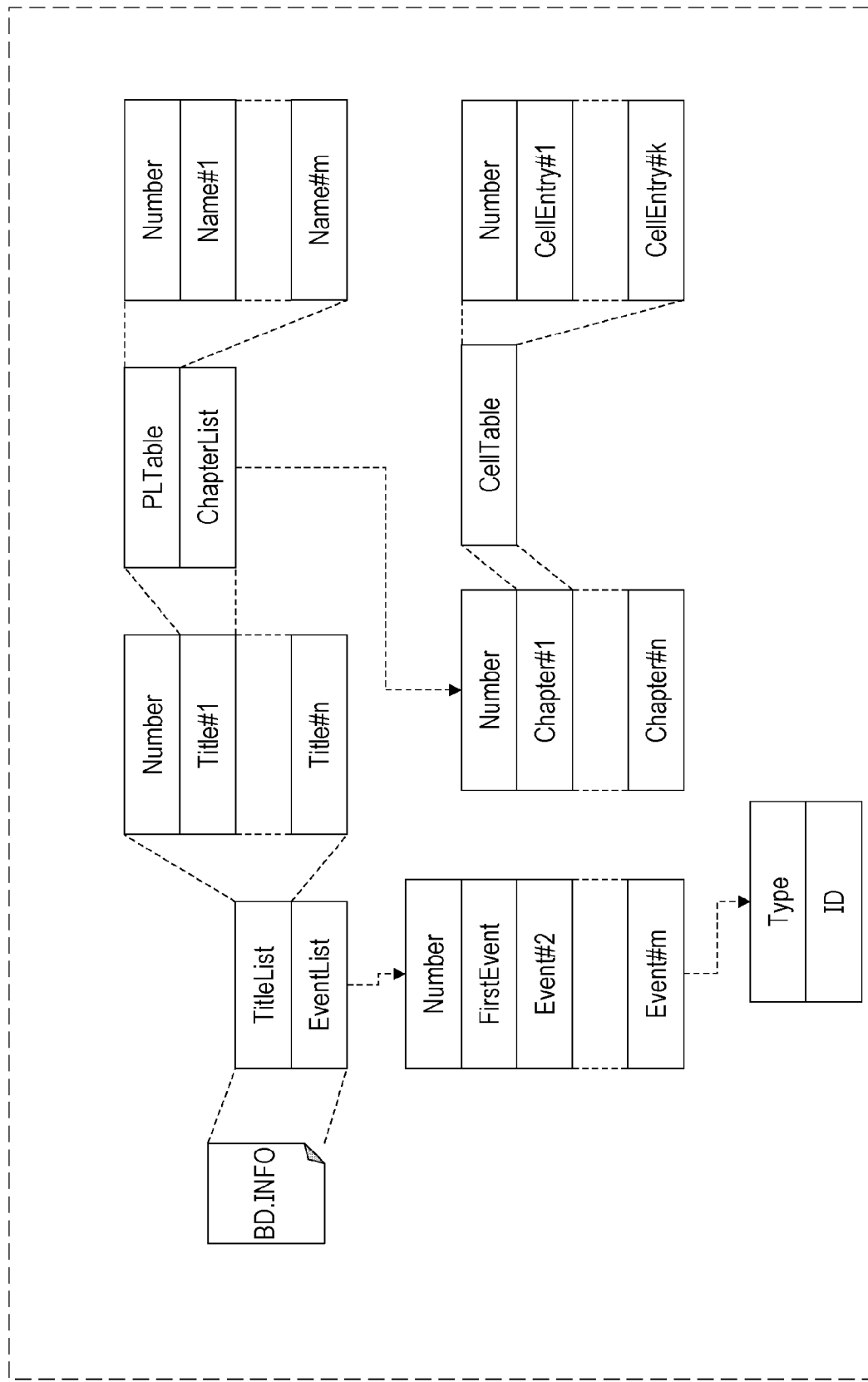
FIG. 18 is a diagram illustrating the configuration of BD.INFO which is overall BD-ROM information.

Next, the information relating to the entire BD-ROM ("BD.INFO") will be described with reference to FIG. 18. FIG. 18 is a diagram illustrating the configuration of BD.INFO which is overall BD-ROM information. The overall BD-ROM information is made up of a title list (TitleList) and event list (EventList) for global events.

The title list (TitleList) is made up of the number of titles in the disc (Number), and subsequently each title information (Title#1 through Title#n).

Each title information (Title#1 through Title#n) includes a playlist table (PLTable) and a chapter list within the title (ChapterList). The playlist table (PLTable) includes the number of playlist in the title (Number) and the playlist names (Name), i.e., the filenames of the playlists.

The chapter list (ChapterList) is made up of the number of chapters included in this title (Number), and each chapter information (Chapter#1 through Chapter#n). Each chapter information (Chapter#1 through Chapter#n) has a table of cells that this chapter includes (CellTable), the cell table (CellTable) being made up of the number of cells (Number) and entry information of each cell (CellEntry#1 through CellEntry#k).

Cell entry information (CellEntry#1 through CellEntry#k) is described as the playlist name containing this cell and the cell No. Within the playlist.

The event list (EventList) has the number of global events (Number) and information of each global event (Event#1 through Event#m). What is noteworthy here is that the global event that is defined first is called a first event (FirstEvent), and is the event that is executed first when the BD-ROM is inserted into the player.

Each global event information (Event#1 through Event#m) has only the event type (Type) and ID of the event (ID).

Figure 19:
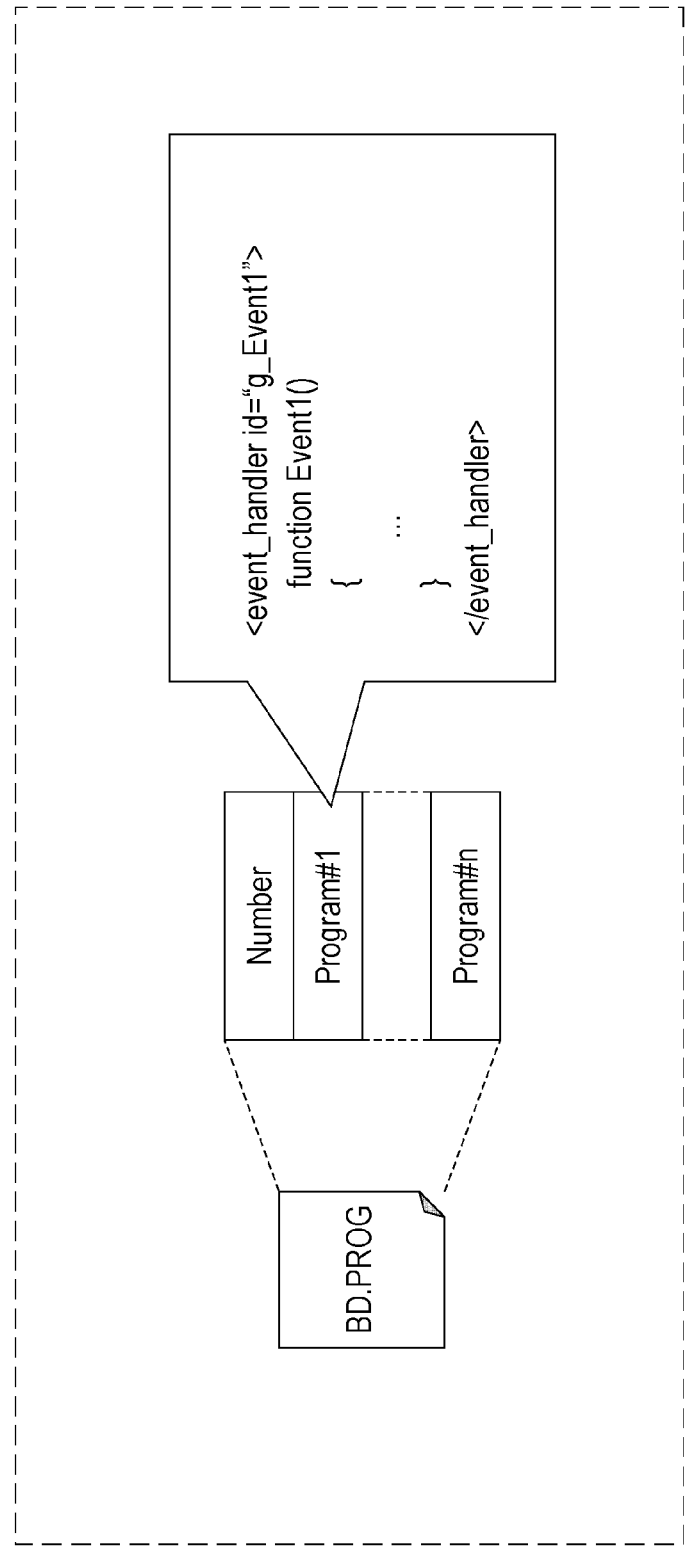
FIG. 19 is a diagram illustrating the structure of a global event handler table.

FIG. 19 is a diagram illustrating the structure of the global event handler table ("BD.PROG"). This table is the same in content as the event handler table described in FIG. 17, so description thereof will be omitted.

Mechanism of Event Occurrence

Figure 20:
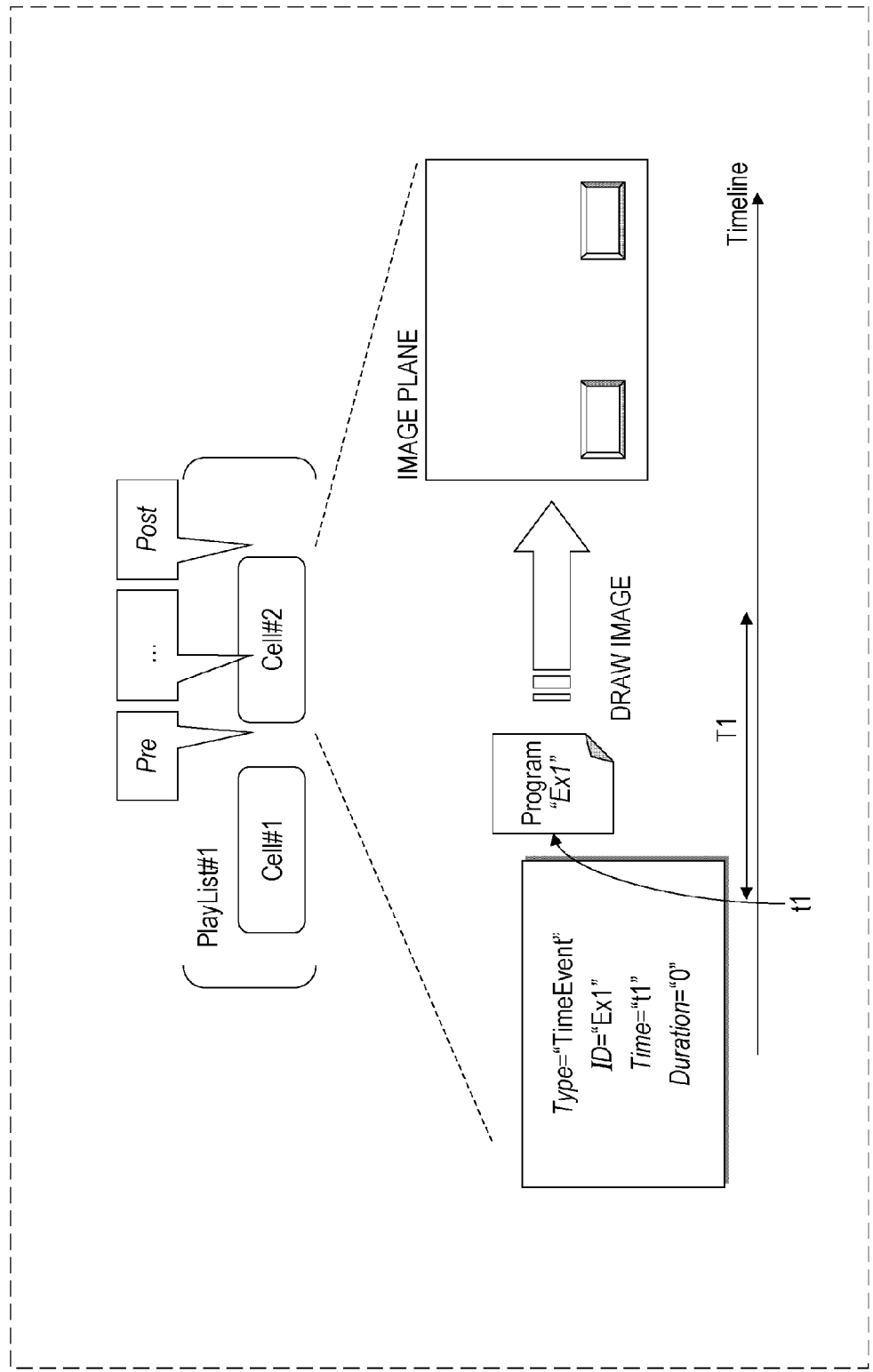
FIG. 20 is a diagram illustrating an example of a time event.

The mechanism of event occurrence will be described with reference to FIGS. 20 through 22. FIG. 20 is a diagram illustrating an example of a time event. As described above, a time event is defined by the event list (EventList) in the playlist ("XXX.PL").

In a case of an event defined as a time event, i.e., event type (Type) is "TimeEvent", at the point of the event generation time ("t1"), a time event having the ID "Ex1" is output from the scenario processor 305 to the program processor 302. The program processor 302 searches for the handler that has the ID "Ex1", and executes the relevant event handler. For example, in the case of the present embodiment, a two-button image can be drawn, or the like.

Figure 21:
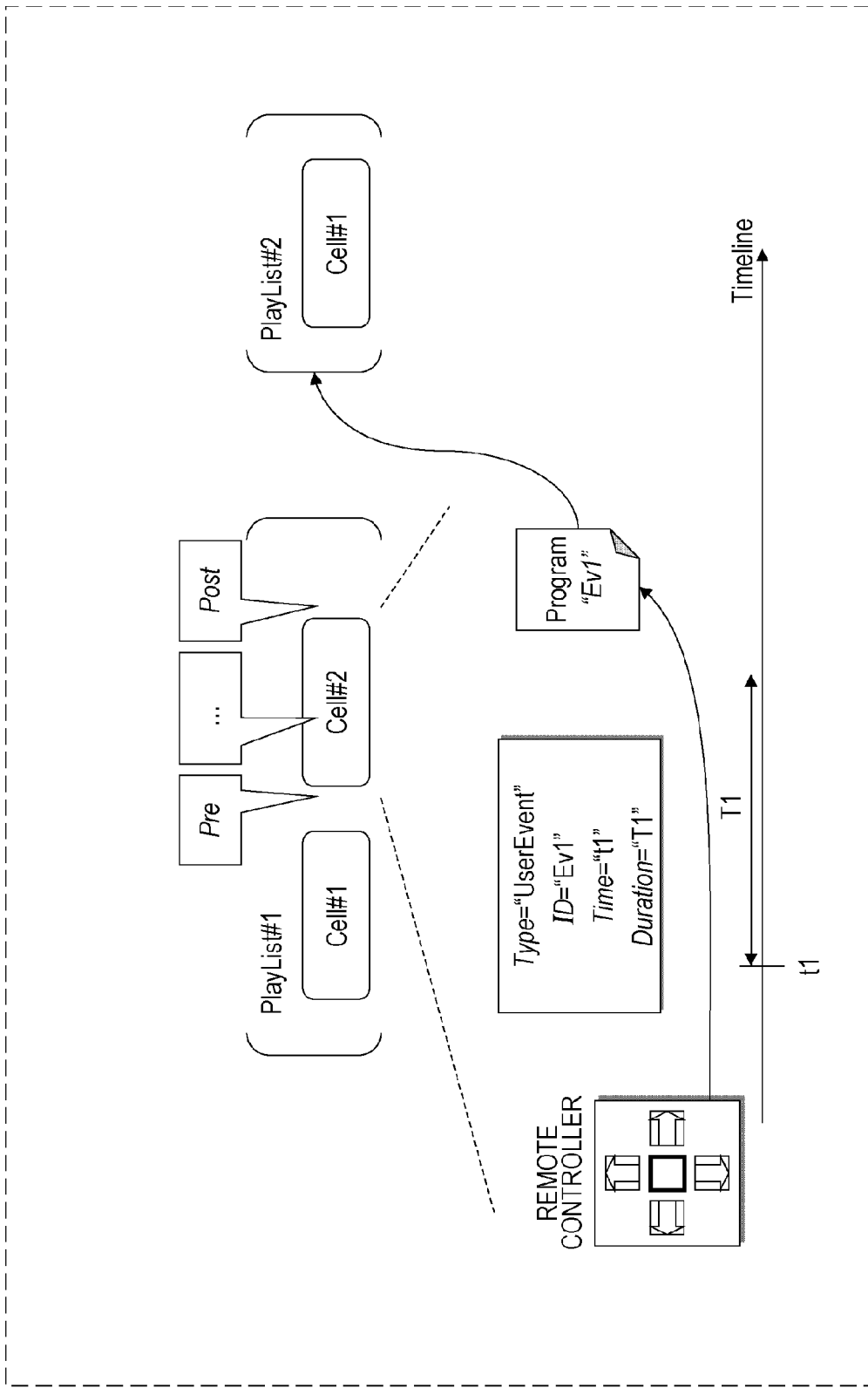
FIG. 21 is a diagram illustrating an example of a user event due to a user having operated a menu.

FIG. 21 is a diagram illustrating an example of a user event due to a user having operated a menu. As described above, a user event due to menu operations is also defined by the event list (EventList) in the playlist ("XXX.PL").

In the case of an event defined as a user event, i.e., in a case where the event type (type) is "UserEvent", this user event is ready at the point that of reaching the event generation time ("t1"). At this time, the event itself is not generated yet. This event is in a ready state during the period ("T1") described in the valid period information (Duration).

When a remote controller key "up", "down", "left", or "right", has been pressed by the user, or when the "OK" key has been pressed, first, a UO event is generated by the UO manager 303 and output to the program processor 302, as illustrated in FIG. 21.

The program processor 302 hands a UO event to the scenario processor 305, and upon receiving the UO event, the scenario processor 305 searches for whether or not a valid user event exists. In a case where there is a relevant user event as the result of the search, the scenario processor 305 generates a user event, and outputs to the program processor 302.

The program processor 302 searches for an event handler having the event ID, in the case of the example illustrated in FIG. 21 for example, "Ev1", and executes the relevant event handler. In the case of this example, playback of playlist#2 is started.

The generated user event does not include information regarding which remote controller key has been pressed by the user. The information of the remote controller key that has been selected is notified to the program processor 302 by the UO event, and is recorded and held in a register that the virtual player has. The program of the event handler can check the value of this register and execute branching processing.

Figure 22:
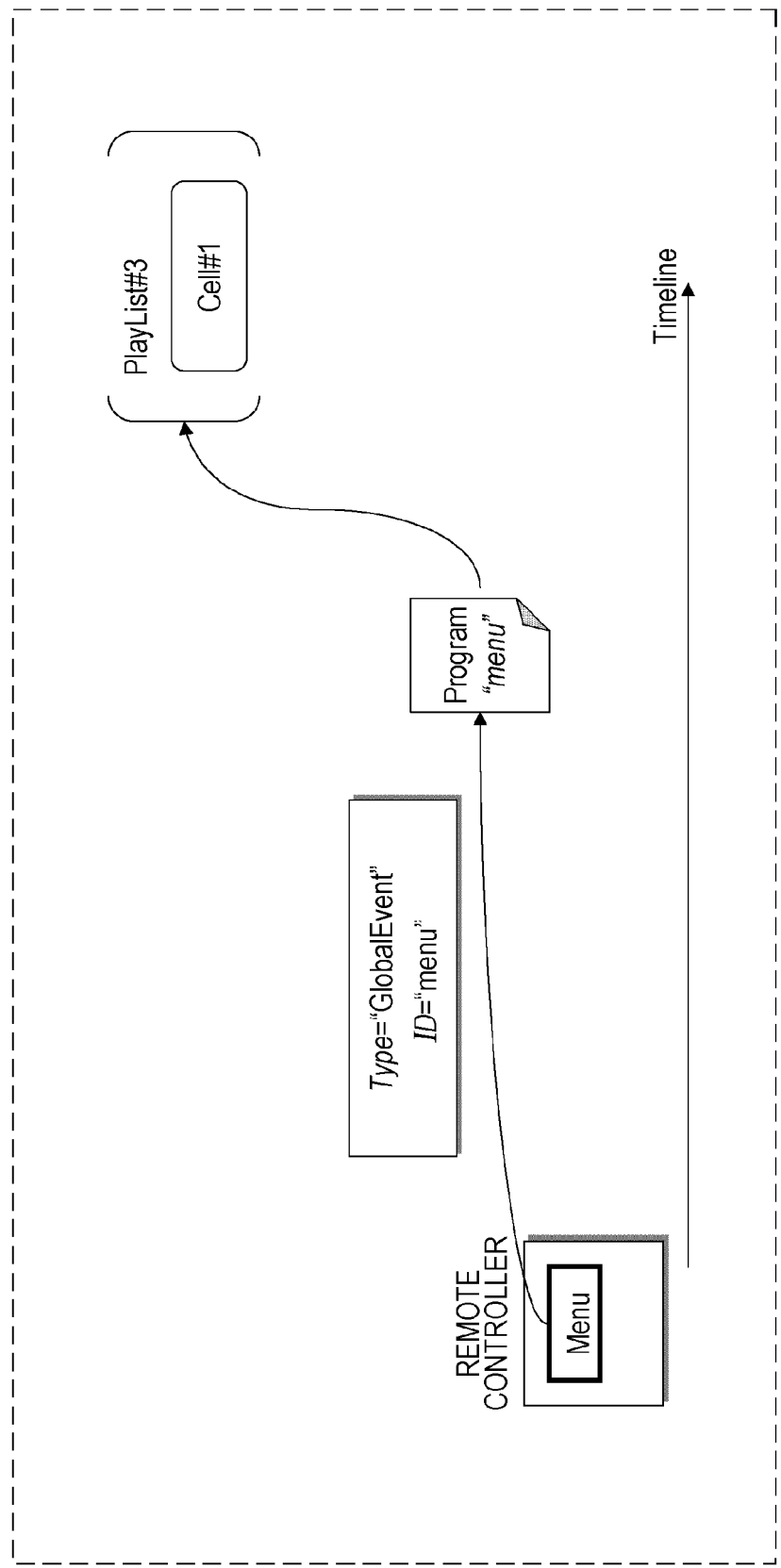
FIG. 22 is a diagram illustrating an example of a global event.

FIG. 22 is a diagram illustrating an example of a global event. As described earlier, a global event is defined in the event list (EventList) in the overall BD-ROM information ("BD.INFO"). An event defined as a global event, i.e., an event of which the event type (Type) is "GlobalEvent", is generated only in a case where the user has operated a remote controller key.

In a case where the user has pressed the menu key, first, a UO event is generated by the UO manager 303 and output to the program processor 302. The program processor 302 hands the UO event to the scenario processor 305.

The scenario processor 305 generates the relevant global event, and sends it to the program processor 302. The program processor 302 searches for an event handler having the event ID "menu", and executes this event handler. For example, in the case of the example illustrated in FIG. 22, playback of playlist#3 is started.

In the present embodiment, this is referred to simply as menu key, but there may be multiple menu keys such as on the remote controller of a player that plays DVDs. Defining an ID corresponding to each menu key enables appropriate processing to be performed as to each menu key.

Virtual Player Machine

Figure 23:
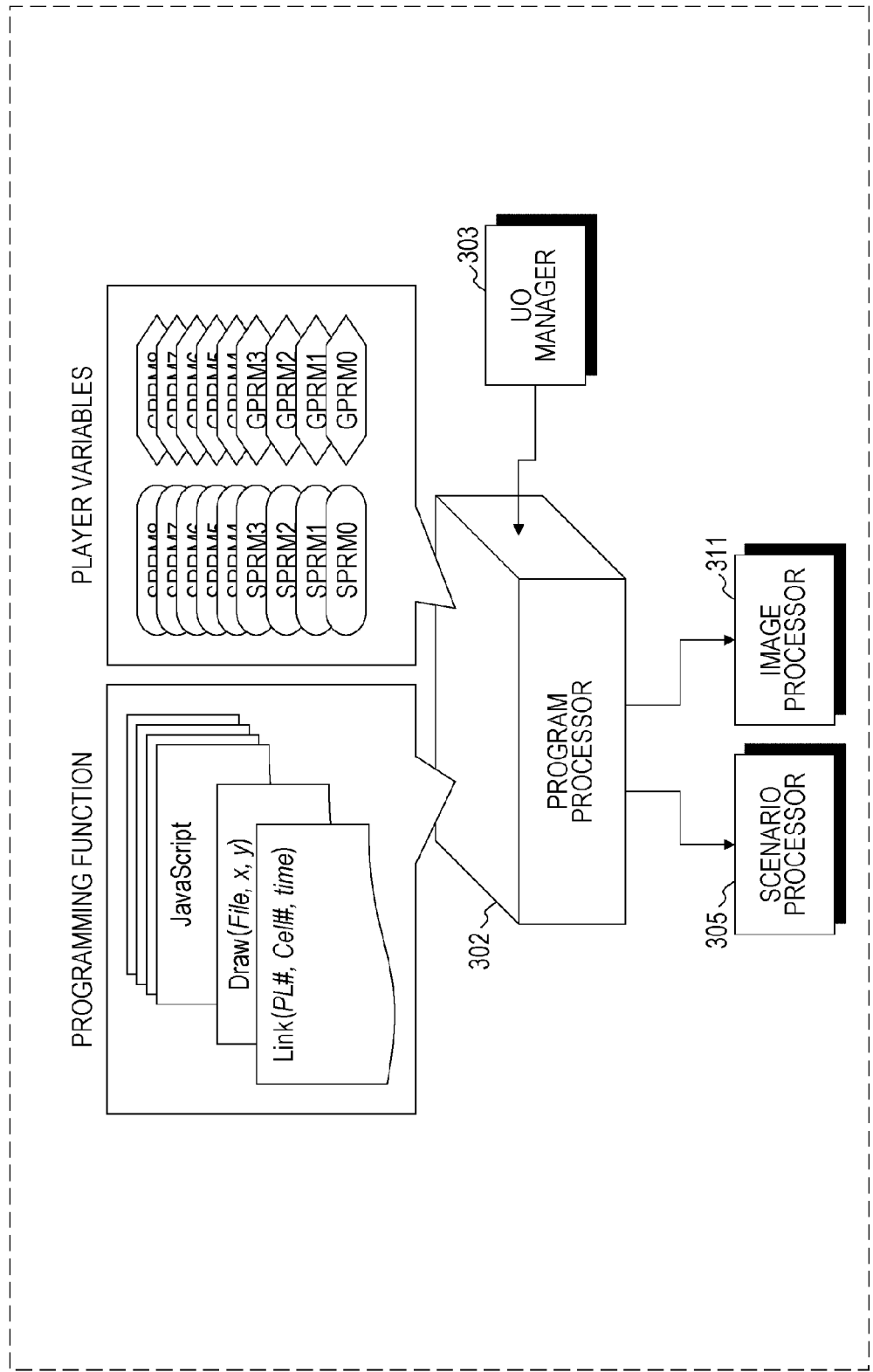
FIG. 23 is a diagram for describing the functional configuration of a program processor.

FIG. 23 is a diagram for describing the functional configuration of the program processor 302. The functional configuration of the program processor 302 will be described with reference to FIG. 23. The program processor 302 is a processing module that has a virtual player machine inside. A virtual player machine is a function model defined as a BD-ROM, and is not dependent on the implementation of each BD-ROM player. That is to say, this guarantees that the same function can be executed in every BD-ROM player.

A virtual player machine has two major functions; programing functions and player variables. The player variables are stored and held in a register. The programming functions are based on JavaScript (registered trademark), and the following three functions are defined as BD-ROM-unique functions.

Figure 25:
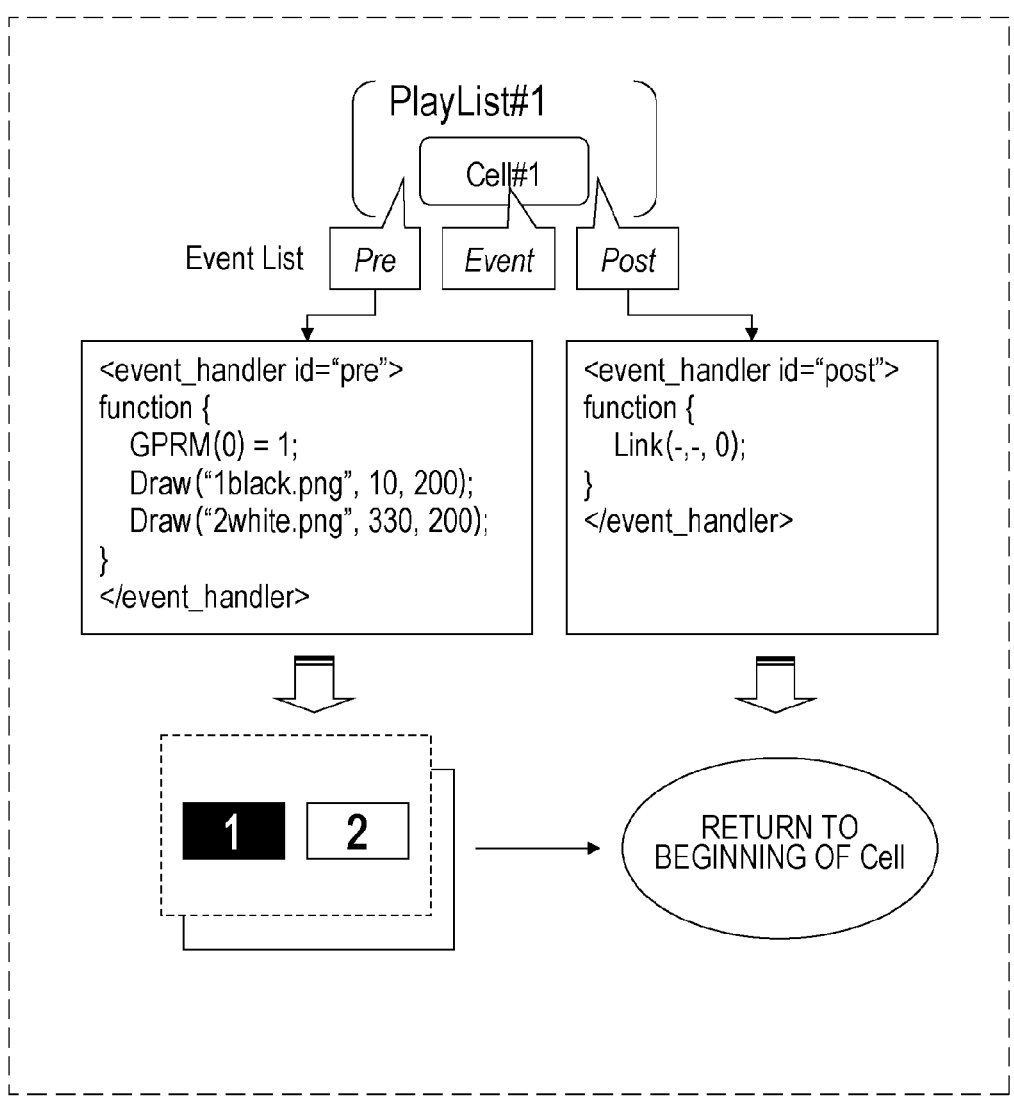
FIG. 25 is a diagram illustrating an example of a program in an event handler according to control of a menu screen having two selection buttons.
Figure 26:
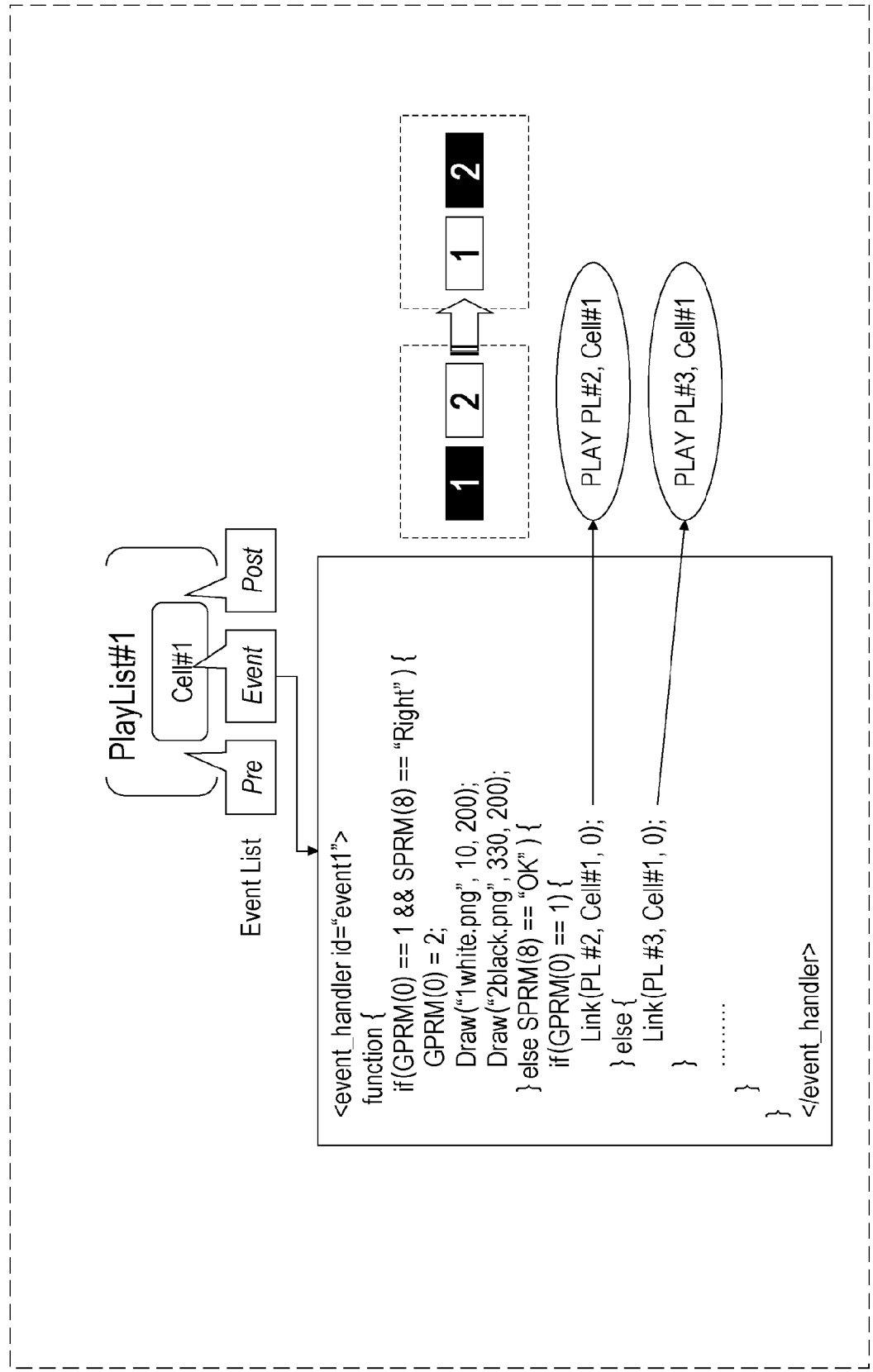
FIG. 26 is a diagram illustrating an example of a program in an event handler relating to a menu selection user event.
Figure 27:
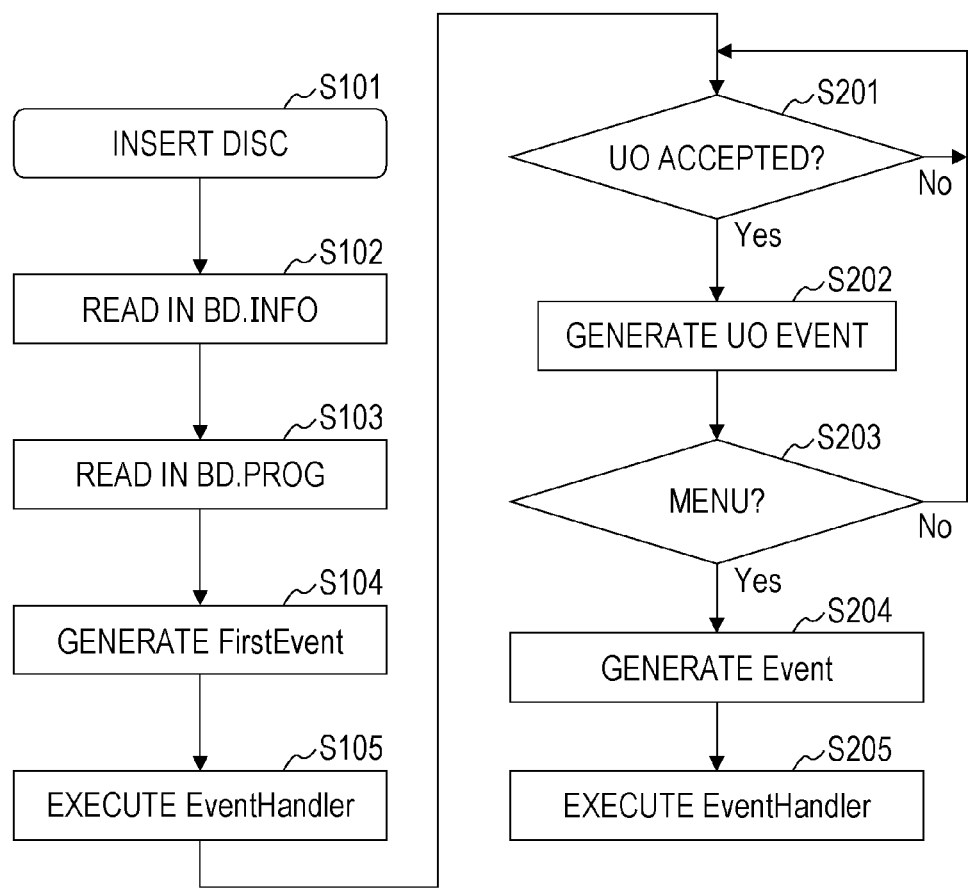
FIG. 27 is a flowchart illustrating the flow of basic processing for playback of AV data in a BD-ROM player.

Link function: Stops the current playback, and starts playback from specified playlist, cell, and time.
   Link (PL#, Cell#, time)
   PL#: playlist name
   Cell#: cell No.
   Time: time in cell to start playback
PNG drawing function: Draws specified PNG data on image plane 209.
   Draw (File, X, Y)
   File: PNG filename
   X: X coordinate position
   Y: Y coordinate position
Image plane clear function: Clears specified region of image plane 209.
   Clear (X, Y, W, H)
   X: X coordinate position
   Y: Y coordinate position
   W: width in X direction
   H: width in Y direction
   The player variables include system parameters (SPRM) indicating setting values and so forth of the player, and general parameters (GPRM) usable in general uses.
   FIG. 24 is a diagram illustrating a list of system parameters (SPRM).
   SPRM(0): Language code
   SPRM(1): Audio stream No.
   SPRM(2): Subtitle stream No.
   SPRM(3): Angle No.
   SPRM(4): Title No.
   SPRM(5): Chapter No.
   SPRM(6): Program No.
   SPRM(7): Cell No.
   SPRM(8): Selected key information
   SPRM(9): Navigation timer
   SPRM(10): playback time information
   SPRM(11): Mixing mode for karaoke
   SPRM(12): Country information for parental
   SPRM(13): Parental level
   SPRM(14): Player setting value (video)
   SPRM(15): Player setting value (audio)
   SPRM(16): Language code for audio stream
   SPRM(17): Language code for audio stream (extended)
   SPRM(18): Language code for subtitle stream
   SPRM(19): Language code for subtitle stream (extended)
   SPRM(20): Player region code
   SPRM(21): reserved
   SPRM(22): reserved
   SPRM(23): Playback state
   SPRM(24): reserved
   SPRM(25): reserved
   SPRM(26): reserved
   SPRM(27): reserved
   SPRM(28): reserved
   SPRM(29): reserved
   SPRM(30): reserved
   SPRM(31): reserved
   Note that in the present embodiment, the programing functions of the virtual player have been described as being based on JavaScript (registered trademark), Other programing functions may be used, such as B-Shell used in UNIX (registered trademark) OS or the like, Perl Script, and so forth, instead of JavaScript (registered trademark). In other words, the programing language in the present disclosure is not restricted to JavaScript (registered trademark).
Example of Program
   FIGS. 25 and 26 are diagrams illustrating an example of a program in the event handler. FIG. 25 is a diagram illustrating an example of a program in an event handler according to control of a menu screen having two selection buttons.
   The program to the left side in FIG. 25 is executed using a time event at the beginning of cell (PlayList#1.Cell#1). "1" is set to GPRM(0) here first, which is one of the general parameters. GPRM(0) is used in this program to identify a button that is selected. A state where the button [1] situated on the left side has been selected is held as the initial state.
   Next, drawing of a PNG is performed for each of button [1] and button [2] using "Draw", which is a drawing function. The button [1] is drawn as a PNG image "1black.png" with coordinates (10, 200) as the origin (upper left end). The button [2] is drawn as a PNG image "2white.png" with coordinates (330, 200) as the origin (upper left end).
   At the end of this cell, the program to the right side in FIG. 25 is executed using a time event. A Link function is used here to instruct playing again from the beginning of this cell.
   FIG. 26 is a diagram illustrating an example of a program in an event handler according to a user event for selection of a menu. In a case where any one of the remote controller keys of the "left" key, "right" key, or "OK" key has been pressed, the corresponding program is written in the event handler. In a case where the user has pressed a remote controller key, a user event is generated as described with reference to FIG. 21, and the event handler illustrated in FIG. 26 is activated.
   The following branching processing is performed by this event handler, using the value of GPRM(0) identifying the selected button, and SPRM(8) identifying the selected remote controller key.
   Condition 1) Case where button[1] is selected, and the selected key is "right" key GPRM(0) is reset to 2, and the button in the selected state is changed to the button[2] at the right. The images of each of button[1] and button[2] are rewritten.
   Condition 2) Case where the selected key is "OK" key, and button[1] is selected Playback of playlist#2 is started.
   Condition 3) Case where the selected key is "OK" key, and button[2] is selected Playback of playlist#3 is started.
   The program illustrated in FIG. 26 is interpreted and executed as described above.
Player Processing Flow
   The flow of processing at the player will be described with reference to FIGS. 27 through 30. FIG. 27 is a flowchart illustrating the basic flow of playback of AV data in a BD-ROM player. Upon a BD-ROM being inserted (S101), the BD-ROM player reads in and analyzes "BD.INFO" (S102), and reads in "BD.PROG" (S103). "BD.INFO" and "BD.PROG" are both temporarily stored in the management information recording memory 204, and analyzed by the scenario processor 305.
   Next, the scenario processor 305 generates the first event, in accordance with the first event (FirstEvent) information in the "BD.INFO" file (S104). The generated first event is received by the program processor 302, which executes the event handler corresponding to this event (S105).
   It is expected that the event handler corresponding to the first event will have recorded therein information specifying a playlist to play first. If no playlist to play first is instructed, the player has nothing to play, and simply awaits a user event to accept (No in S201).
   Upon receiving a remote controller operation from the user (Yes in S201), the UO manager 303 generates a UO event for the program processor 302 (S202).
   The program processor 302 determines whether or not the UO event is due to the menu key (S203), and in the case of the menu key (Yes in S203), hands the UO event to the scenario processor 305, and the scenario processor 305 generates a user event (S204). The program processor 302 executes the event handler corresponding to the generated user event (S205).

Figure 28:
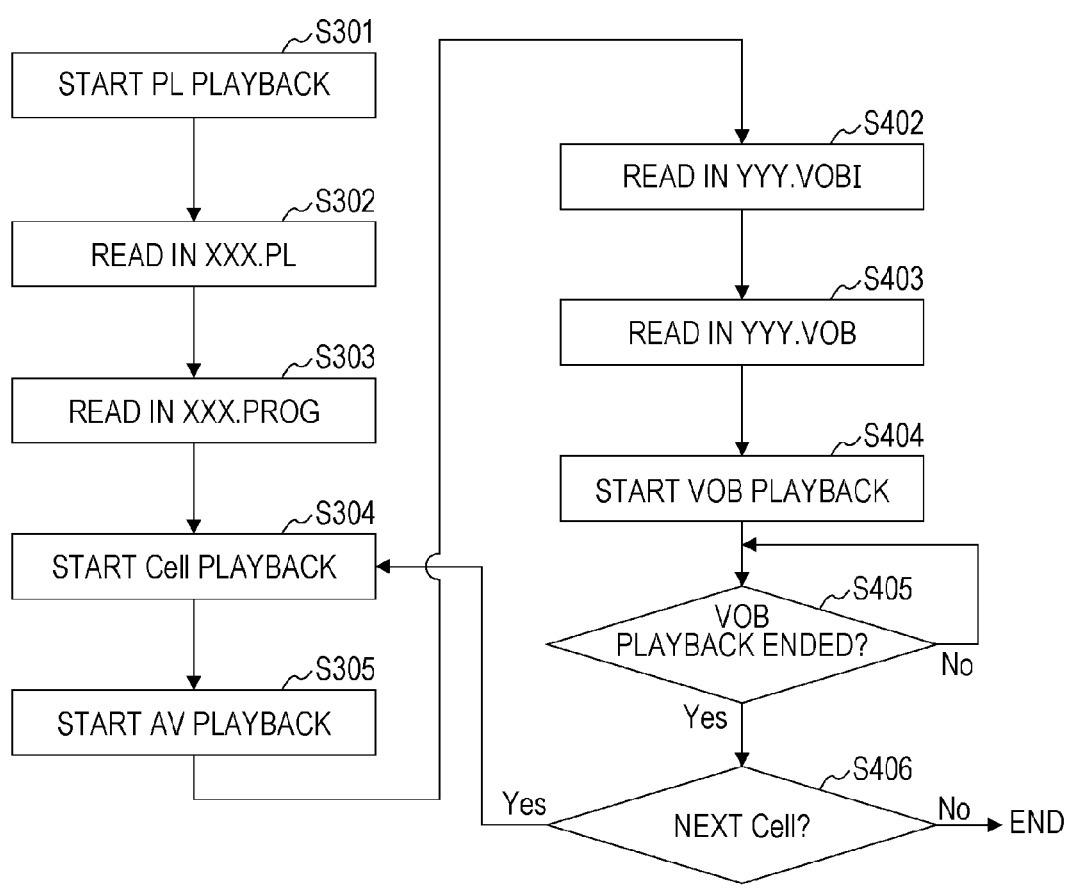
FIG. 28 is a flowchart illustrating the flow of processing in a BD-ROM player from starting to play a playlist until ending playing of the VOB.

FIG. 28 is a flowchart illustrating the flow of processing in a BD-ROM player from starting to play a playlist until ending the VOB. As described earlier, playback of a playlist is started by the first event handler or global event handler (S301). The scenario processor 305 reads in and analyzes the playlist "XXX.PL" as necessary information to play a playlist that is the object of playback (S302), and reads in the program information "XXX.PROG" corresponding to the playlist (S303).

Next, the scenario processor 305 starts playback of the cell, based on the cell information registered in the playlist (S304). Cell playback means that a request is issued from the scenario processor 305 to the presentation controller 306, and the presentation controller 306 starts AV data playback (S305).

Once playback of AV data is started, the presentation controller 306 reads in the VOB information file "YYY.VOBI" corresponding to the cell being played (S402) and analyzes it. The presentation controller 306 identifies the VOBU for which to start playback and the address thereof, using the time map, and instructs the drive controller 317 of the readout address. The drive controller 317 reads out the relevant VOB data "YYY.VOB" (S403).

The VOB data that has been read out is sent to the decoder, and playback is started (S404). VOB playback is continued until the playback section of this VOB ends (S405), and upon ending, if there is a next cell (Yes in S406), transitions to playback of Cell (S304). In a case where there is no next cell (No in S406), the processing relating to playback ends.

FIGS. 29A and 29B show flowcharts illustrating the flow of event processing from after having started AV data playback. FIG. 29A is a flowchart illustrating the flow of processing relating to a time event in a BD-ROM player.

Note that the BD-ROM player is an event-driven player model. When playback of a playlist is started, the time event related, user event related, and subtitle display related event processing processes are each activated, and event processing is executed in parallel.

When playback of playlist playback is started at the BD-ROM player (S501), confirmation is made that playlist playback has not ended (S502), and the scenario processor 305 confirms whether the time event generation time has arrived (S503).

In a case where the time event generation time has arrived (Yes in S503), the scenario processor 305 generates a time event (S504). The program processor 302 receives the time event, and executes the event handler (S505).

In a case where the time event generation time has not arrived (No in S503), and in a case where execution of the event handler has ended, the processing after confirmation of end of the playlist playback (S502) is repeated.

In a case where confirmation is made that the playlist playback has ended (Yes in S502), the time event related processing is force-quit.

FIG. 29B is a flowchart illustrating the flow of processing relating to a user event in a BD-ROM player. When playback of playlist playback is started at the BD-ROM player (S601), confirmation is made that playlist playback has not ended (No in S602), and the UO manager 303 confirms whether a UO has been accepted.

In a case where there has been a UO accepted (Yes in S603), the UO manager 303 generates a UO event (S604). The program processor 302 accepts the UO event, and confirms whether the UO event is a menu call or not.

In the case of a menu call (Yes in S605), the program processor 302 causes the scenario processor 305 to generate an event (S607), and the program processor 302 executes the event handler (S608).

On the other hand, in a case where determination is made that the UO event is not a menu call (No in S605), this means that the UO event is an event due to a cursor key or the "OK" key. In this case, the scenario processor 305 determines whether or not the current time is within the valid period of the user event. If within the valid period (Yes in S606) the scenario processor 305 generates a user event (S607), and the program processor 302 executes the relevant event handler (S608).

In a case where there is no UO accepted (No in S603), the current time is not within the valid period of the user event (No in S606), or the execution of the event handler has ended, the processing following confirmation of the end of the playlist playback (S602) is repeated.

Upon confirmation of the end of the playlist playback (Yes in S602), the user event related processing is force-quit.

Figure 30:
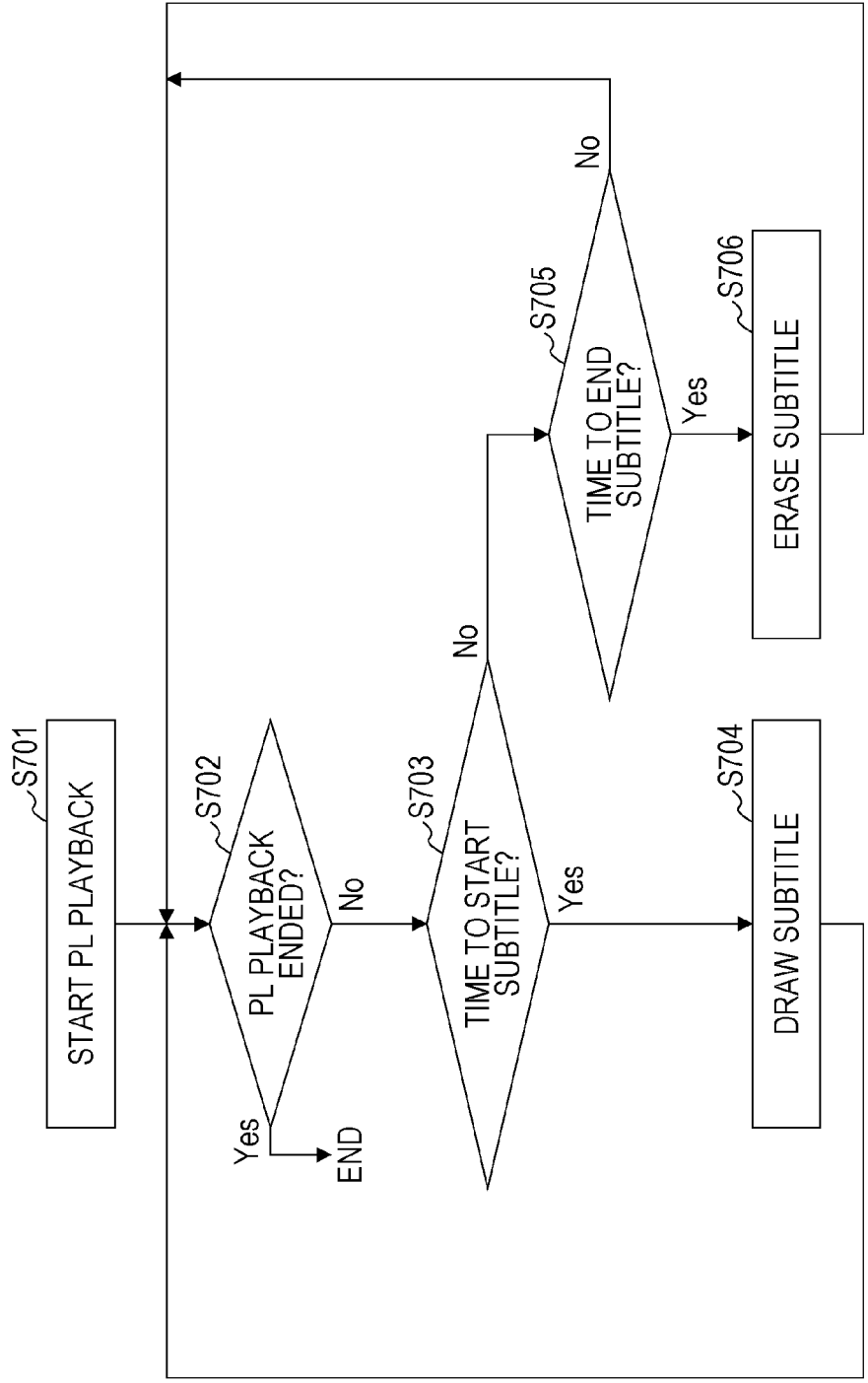
FIG. 30 is a flowchart illustrating the flow of processing subtitle data in a BD-ROM player.

FIG. 30 is a flowchart illustrating the flow of processing of subtitle data in the BD-ROM player. When playback of playlist playback is started at the BD-ROM player (S701), confirmation is made that playlist playback has not ended (No in S702), and the scenario processor 305 confirms whether the subtitle display start time has arrived or not. In a case where the subtitle display start time has arrived (Yes in S703), the scenario processor 305 instructs the presentation controller 306 to draw the subtitle, and the presentation controller 306 instructs the image processor 311 to draw the subtitle. The image processor 311 follows the instruction to draw the subtitle on the image plane 209 (S704).

Also, in a case where the subtitle display start time has not arrived (No in S703), confirmation is made whether the subtitle display end time has arrived. In a case where the subtitle display end time has arrived (Yes in S705), the presentation controller 306 instructs the image processor 311 to erase the subtitle.

The image processor 311 erases the subtitle that has been drawn, in accordance with the instruction from the image plane 209 (S706).

In a case where the subtitle drawing by the image processor 311 (S704) has ended, a case where erasing of the subtitle by the image processor 311 (S706) has ended, and a case where determination is made that the subtitle display end time has not arrived (No in S705), the processing following configuration of end of the playlist playback (S702) is repeated.

Also, upon confirmation of the end of the playlist playback (Yes in S702), the subtitle related processing is force-quit.

According to the above operations, the BD-ROM player performs basic processing relating to BD-ROM playback based on user instructions or the BD management information recorded in the BD-ROM, and so forth.

Second Embodiment

Next, a second embodiment of the present disclosure will be described. The content of the second embodiment relates to recording and playback of high-bitrate video information with regard to BDs. This basically is based on the first embodiment, so portions that are expanded or different will primarily be described in the second embodiment.

Figure 31:
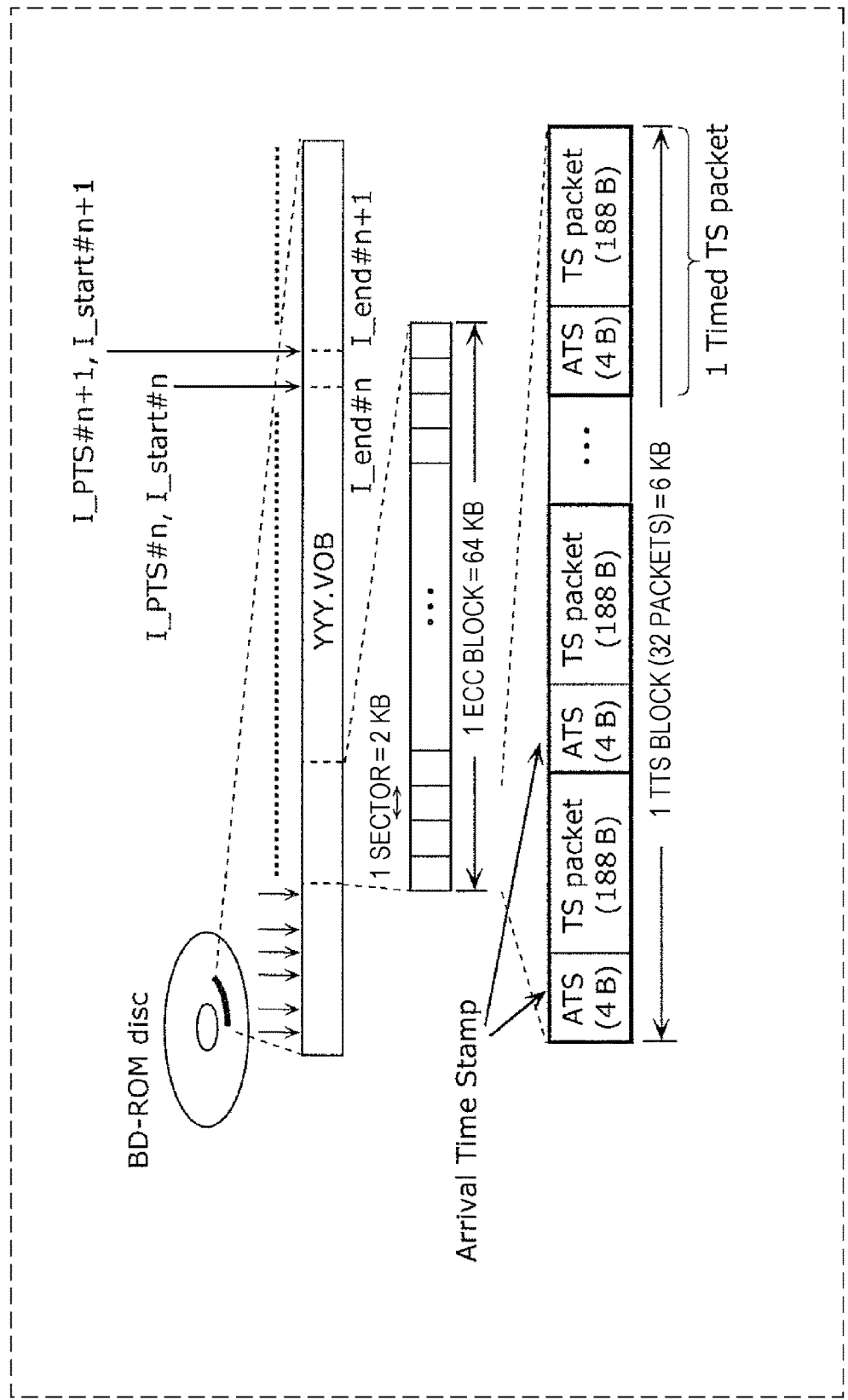
FIG. 31 is a diagram illustrating a digital stream structure in a BD.

FIG. 31 is a diagram illustrating a digital stream structure in a BD. The YYY.VOB file is a multiplexed digital stream. A total of 192 bytes of a 188-byte MPEG-2 TS packet and a 4-byte Arrival Time Stamp (ATS) that is input time information of the TS packet to T-STD, form one Timed TS packet in the digital stream. 32 of these configure one TTS block (32 Timed TS packets), which is a smallest-unit file. The data size of one TTS block is 6 KB, and a BD is made up of 2-KB sectors, so one TTS block is recorded over exactly three sectors.

Figure 32:
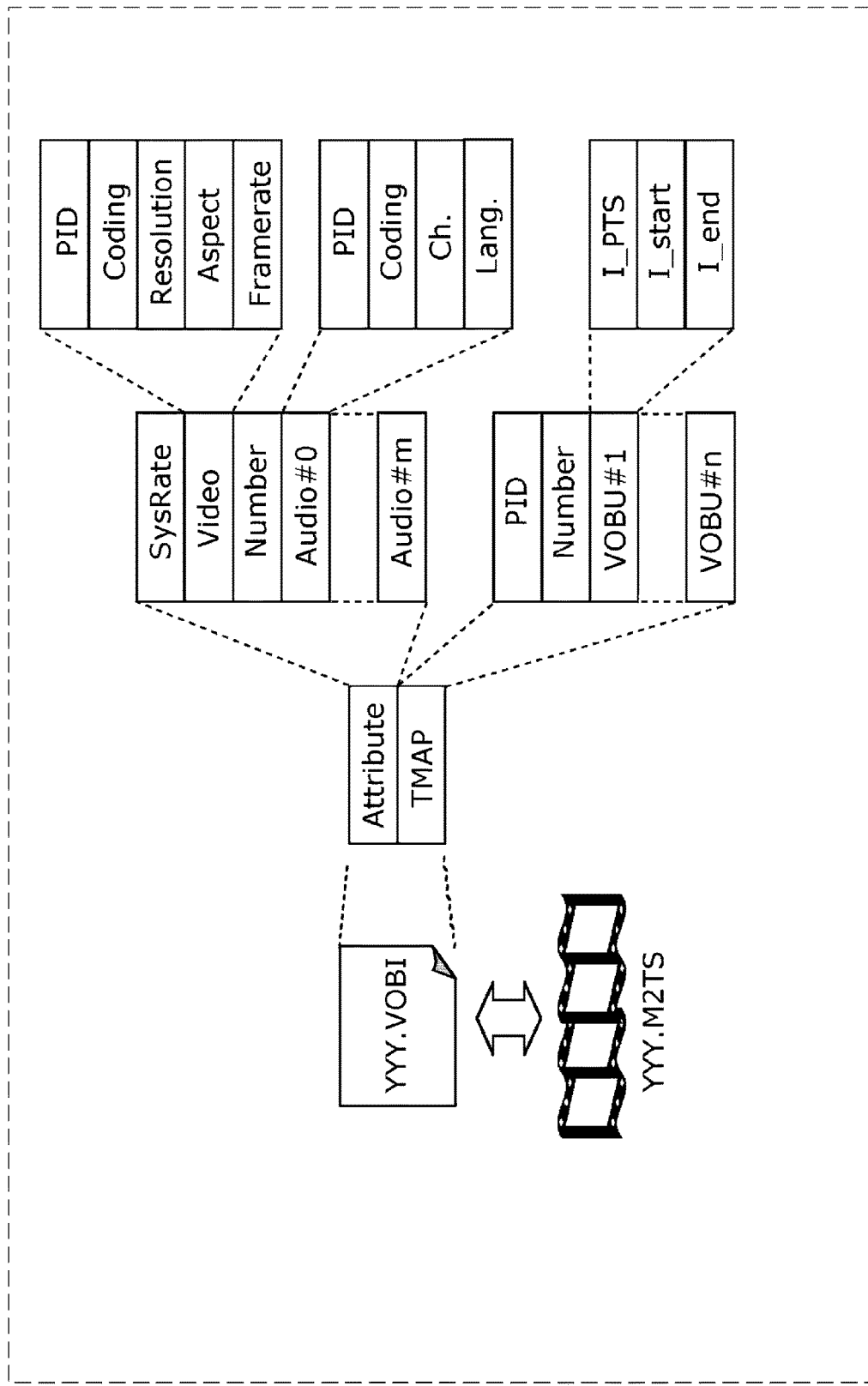
FIG. 32 is a diagram where the YYY.VOBI information illustrated in FIG. 13 has been slightly modified assuming MPEG-2 TS.

FIG. 32 is a diagram where the YYY.VOBI information illustrated in FIG. 13 has been slightly modified assuming MPEG-2 TS. For example, PID (Packet IDentifier) information is situated at the beginning of elementary streams to identify the elementary streams in an MPEG-2 TS, and encoding attribute information of the elementary stream is described after the PID.

Unlike FIG. 13, the following information is managed in the YYY.VOBI file in the MPEG-2 TS.
System stream rate (SysRate)
Peak bitrate of MPEG-2 TS stream
Identification information of stream (PID)
PID No. of this stream
Compression format (Coding):
MPEG4-AVC (H.264)
HEVC (H.265)
Resolution (Resolution):
3840×2160
1920×1080
1280×720

The random access table information (TMAP) manages the playback start time (PTS) of an I picture in the digital stream, multiplexing start position information (I_start) of this I picture, and size information (I_end) from I_start to the multiplexing end position of the I picture on the multiplexed stream. That is to say, TMAP includes the PTS, I_start, and I_end.

I_start may be the No. of timed TS packets in ascending order in the YYY.VOB file. I_end may be the byte size from the Timed TS packet including the start byte of the I picture to the Timed TS packet including the end byte of the I picture in the multiplexed stream, and the byte size may be expressed in rounded-off values.

FIG. 31 described above illustrates the way in which multiple I pictures are registered in the YYY.VOB in accordance with random access table information (TMAP) within the YYY.VOBI file. For example, the n'th random access point information within the TMAP includes
playback start time of n'th I picture (I_PTS#n),
multiplexing start position information of n'th I picture (I_start#n), and
size information from I_start to multiplexing end position of n'th I picture on multiplexed stream (I_end#n).

To access an I picture registered at the n'th random access point, the player can read the entire I picture by reading in from the position of I_start#n within the YYY.VOB file to the data size at I_end #n. That is to say, the player can play this I picture. In this way, the player can efficiently read just the I picture that can be randomly accessed, by using the TMAP.

Now, if it were possible to describe I_end in units of byte size or in units of number of packets, I_end could appropriately express the multiplexing end position of low-bitrate I pictures and the multiplexing end position of high-bitrate I pictures. However, if the TMAP size were to be all read into the limited memory of the player, there conceivably may be cases where only an extremely small amount of information can be imparted to I_end. For example, in a case where only three bits are imparted to I_end, it is difficult to appropriately express the multiplexing end position of low-bitrate I pictures and the multiplexing end position of high-bitrate I pictures using the eight values of the three bits.

FIGS. 33A and 33B are diagrams describing the meaning of I_end in a case where a 3-bit field is used as I_end. In FIG. 33A, the size of I_end is defined assuming a digital stream where 2K video information is encoded. The size is defined every 100 KB as one example here.

When the data size of an I picture is rounded off to a stipulated data size, I_end is a value indicating the stipulated size No. In other words, I_end is a value indicating the stipulated size No. when the data size of an I picture is rounded off to a stipulated size. For example, the larger the stipulated size No. of I_end is, the larger the size indicated is. By rounding off, in a case where the data size of an I picture in the multiplexed data stream (I_MUX_SIZE) is 150 KB, the I picture size is larger than 100 KB×1 and smaller than 100 KB×2, so the value of I_end is $001_b$ when expressed in binary.

In the example in FIG. 33A, in a case where the multiplexing end position of the I picture included in a range larger than 100 KB×m from the multiplexing start position and equal to or less than 100 KB×(m+1), The value of I_end is a value where m is expressed in binary. While m is an integer 0 or larger and 7 or smaller, in a case where the multiplexing end position of the I picture exceeds 100 KB×7 from the multiplexing start position, the data size of the I picture is m=7 regardless of how large it is. That is to say, the value of I_end is $111_b$.

Now, the definition described above is not appropriate for expressing the I_end for a high-bitrate digital stream where 4K video information or 8K video information has been encoded. It can be assumed that the bitrate of a digital stream where 4K video or 8K video has been encoded will be high. That is to say, it can be assumed that the multiplexing size of the I picture will be large as well. Accordingly, the value of I_end will always be $111_b$ based on the above definition. That is to say, I_end will only mean that the multiplexing size of the I picture is constantly larger than 700 KB. In such an arrangement, the I_end used to efficiently read in I pictures looses all meaning, and the random accessibility of the player is lost as well.

Accordingly, an arrangement where the meaning of I_end changes in accordance with resolution is suitable. For example, with regard to a digital stream where video information of 2K resolution or lower has been encoded, the stipulated size for I_end can be in increments of 100 KB, as illustrated in FIG. 33A. On the other hand, with regard to a digital stream with a high bitrate that is greater than 2K resolution (e.g., a digital stream where 4K video information or 8K video information has been encoded), the stipulated size for I_end can be a larger size as that illustrated in FIG. 33A, as illustrated in FIG. 33B. That is to say, it is suitable for two tables with different meaning to be used in accordance with the resolution of the digital stream.

In FIG. 33B, the data size of an I picture in the multiplexed stream (I_MUX_SIZE) is expressed by I_end using 768-KB unit sizes. Accordingly, there is a high possibility that even in a high-bitrate digital stream such as 100 Mbps or the like, the I_end will be one of the values from $000_b$ to $110_b$. Such a BD can contribute to random accessibility of the player.

In the table illustrated in FIG. 33B, the smallest common multiple of 64 KB, which is the ECC block size that is the read unit of a BD, and the 6 KB, which is TTS block size that is the data structure unit of the digital stream, is 192 KB, so I_end is preferably expressed in size units of integer multiples of 192 KB. This optimizes read processing by the player (drive) when performing random access processing, transfer on the memory, processing on the memory, and so forth, so high speed of random access processing can be expected.

A situation can be assumed where one or the other of the two types of tables illustrated in FIGS. 33A and 33B is used in accordance with the resolution information (Resolution) in the video encoding information (Video) illustrated in FIG. 32. That is to say, the table in FIG. 33A is used if the video resolution is 1920×1080 or lower, while the table in FIG. 33B is used if the video resolution is 3840×2160 or higher, i.e., one or the other of the two tables is used in accordance with video resolution.

Note that this using of one or the other does not have to be based on video resolution. For example, the two tables may be switched in accordance with the value of the system bitrate of the digital stream itself (SysRate in FIG. 32). The system bitrate is rephrased as the peak value of the bitrate of the digital stream. For example, an arrangement may be made where the table in FIG. 33A is used for digital streams having a system bitrate up to 48 Mbps, and the table in FIG. 33B is used for digital streams having a system bitrate exceeding 48 Mbps. That is to say, the I_end stored in the encoding management information file in a case that SysRate indicates a bitrate larger than a predetermined value indicates a larger data size than an I_end of the same value stored in a stream encoding management information file indicating a bitrate equal to or smaller than a predetermined value. Advantages the same as the case based on video resolution can be expected by using one or the other in this way as well.

As described above, random access table information (TMAP) is optimized in accordance with attribute values in the management information file (YYY.VOBI) corresponding to the stream file (YYY.VOB) in the present disclosure.

Specifically, a BD records a video stream (stream file) that is encoded video information, TMAP, and SysRate of the video stream, as illustrated in FIGS. 31 and 32. A BD is an example of a recording medium, TMAP is an example of map information, and SysRate is an example of bitrate information.

As illustrated in FIG. 32, TMAP includes the PTS of I pictures that can be independently decoded that are included in the video stream, I_start indicating the data start position of an I picture in the video stream, and I_end indicating the data size of the section where the I picture is recorded in the video stream, based on the predetermined stipulated data size. PTS is an example of playback start time information, I_start is an example of start position information, and I_end is an example of size information. The above stipulated data size differs depending on the SysRate.

Accordingly, I_end can appropriately indicate the end position of an I picture in accordance with SysRate. That is to say, such a BD can improve random accessibility of the player.

I_end specifically is a value indicating the data size of a section where an I picture is recorded based on a first stipulated data size, in a case where SysRate exhibits a bitrate larger than a predetermined value. The first stipulated data size is, for example, 768 KB, as illustrated in FIG. 32. That is, I_end is a value meaning that the smallest unit is 768 KB. Also, I_end is a value indicating the data size of a section where an I picture is recorded based on a second stipulated data size that is smaller than the first stipulated data size, in a case where SysRate exhibits a bitrate equal to or smaller than a predetermined value. The second stipulated data size is, for example, 100 KB, as illustrated in FIG. 32. That is, I_end is a value meaning that the smallest unit is 100 KB.

Thus, the definition of the stipulated data size of I_end (the data size meaning the smallest unit) changes in accordance with the SysRate in the above BD. Accordingly, I_end and appropriately indicate the end position of I pictures in both cases where SysRate indicates a bitrate larger than the predetermined value and a bitrate equal to or smaller than the predetermined value. Such a BD can improve random accessibility of the player.

Note that the first stipulated data size specifically is preferably a value assigned every 192×n×1024 bytes (where n is a natural number). The smallest common multiple of 64 KB, which is the ECC block size that is the read unit of a BD, and the 6 KB, which is TTS block size that is the data structure unit of the digital stream, is 192 KB, as described in FIG. 31. Accordingly, expressing I_end by a natural multiple of 192×1024 bytes aligns the data size. Therefore, such a BD can realize simplification and high speed of read processing and so forth of the player when performing random access processing.

The predetermined value specifically is 48,000,000 bits/second. The I_end of such a BD can appropriately indicate the end position of I pictures in both cases where the SysRate is higher than 48 Mbps and where 48 Mbps or lower. That is to say, such a BD can improve the random accessibility of the player.

I_end specifically is a value having a 3-bit length. Such a BD can appropriately indicate the end position of I pictures even in cases where I_end is a restricted information amount (3 bits).

Figure 34:
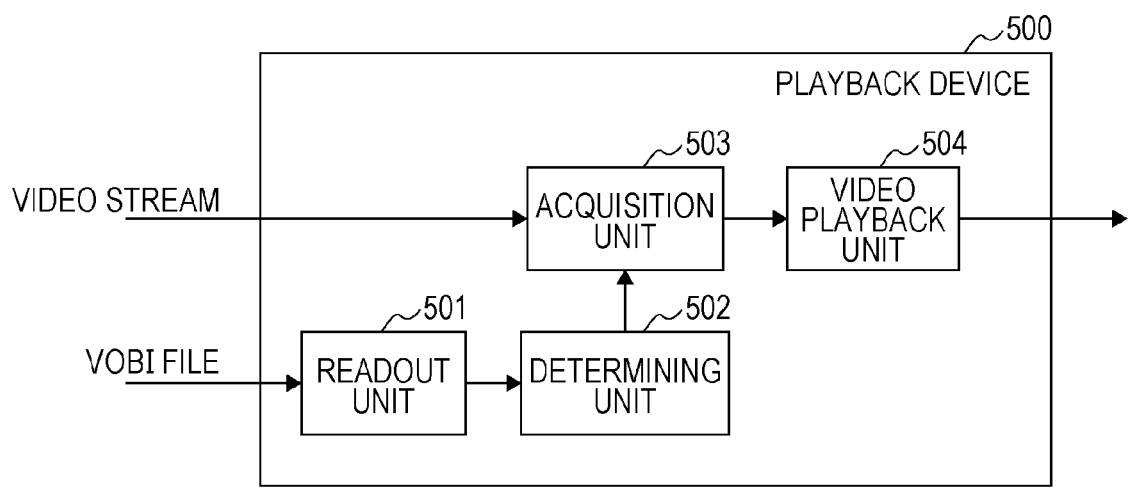
FIG. 34 is an example of a functional block diagram of a playback device.

A player (playback device) corresponding to such a BD is configured as illustrated in FIG. 34, for example. FIG. 34 is an example of a functional block diagram of a playback device. The playback device 500 includes a readout unit 501, a determining unit 502, an acquisition unit 503, and a video playback unit 504.

The readout unit 501 reads out TMAP and SysRate. The TMAP includes the PTS, I_start, and I_end, so these information are also read out by the readout unit 501. The determining unit 502 performs determination of the stipulated data size of I_end included in the TMAP that has been read out, in accordance with the SysRate that has been read out. Specifically, the determining unit 502 determines that I_end is a value indicating the data size of the section where an I picture is recorded based on the first stipulated data size, in a case where SysRate indicates a bitrate larger than the predetermined value. The determining unit 502 determines that I_end is a value indicating the data size of the section where an I picture is recorded based on the second stipulated data size that is smaller than the first stipulated data size, in a case where SysRate indicates a bitrate equal to or smaller than the predetermined value. The acquisition unit 503 acquires the I picture from the video stream based on the results of determination, and the I/start and I_end included in the TMAP that has been read out. Specifically, the acquisition unit 503 acquires data of the data size to be read in from the stipulated size No. that the value of I_end indicates and the stipulated data size based in the determination of the determining unit 502 (first stipulated data size or second stipulated data size), starting from the data start position indicated by I_start. An I picture is included in the acquired data, so the acquisition unit 503 further acquires the I picture from the acquired data. The video playback unit 504 decodes and plays the acquired I picture. Such a playback device can handle the I_end in the above BD as an appropriate data size in accordance with individual streams, and is useful as a playback device with improved random accessibility.

The second embodiment has thus been described. The above description is only an example, and one skilled in the art will be capable of various applications based on the above-described disclosure.

In the above embodiments, the components may be realized by a dedicated hardware configuration, or by executing a software program suitable for the components. The components may be realized by a program executing unit such as a CPU or like processor reading out and executing a software program recorded in a recording medium such as a hard disk or semiconductor memory or the like. The software that realizes the playback device 100 and so forth in the above-described embodiments is a program that causes a computer to execute the steps included in the flowchart illustrated in FIG. 41B, for example.

Although the recording medium, playback method, and playback device according to one or multiple forms have been described by way of embodiments, the present disclosure is not restricted to these embodiments. Embodiments of various modifications conceivable by one skilled in the art, and forms configured by combining components in different embodiments, may be included in the scope of the present disclosure without departing from the essence of the present disclosure.

For example, the present disclosure may be realized as a recording medium manufacturing method (data recording method) or a recording medium manufacturing device (data recording device) as described above.

The recording medium, playback method, and playback device according to the present disclosure is capable of appropriately expressing the size of an I picture on a digital stream, that is a random access point multiplexed on the digital stream, regardless of whether the digital stream is of a low bitrate or a high bitrate such as 4K. Accordingly, these are useful as a recording medium, playback method, and playback device that can provide the user with quicker random accessibility.

What is claimed is:

1. A playback device that reads out and plays content from a non-transitory recording medium in which are recorded
    a video stream that is encoded video information, and
    map information,
    wherein the map information includes
    playback start time information of a picture (PTS) that is included in the video stream and is independently decodable,
    start position information (I_start) indicating a data start position of the picture, and
    size information (I_end) indicating a data size of a section where the picture is recorded, based on a predetermined stipulated data size,
    the playback device comprising:
    a reader that reads out the map information;
    a determiner that determines the stipulated data size indicated by the size information included in the map information that has been read out;
    an acquirer that acquires the picture from the video stream based on the result of the determination, and the start position information and the size information included in the map information that has been read out;
    a video player that decodes and plays the acquired picture;
    wherein the stipulated data size of 4K resolution of the video stream is larger than the stipulated data size of 2K resolution of the video stream.

2. A playback method of reading out and playing content from a non-transitory recording medium in which are recorded
    a video stream that is encoded video information, and
    map information,
    wherein the map information includes
    playback start time information of a picture (PTS) that is included in the video stream and is independently decodable,
    start position information (I_start) indicating a data start position of the picture, and
    size information (I_end) indicating a data size of a section where the picture is recorded, based on a predetermined stipulated data size,
    the playback method comprising:
    reading out the map information;
    determining the stipulated data size indicated by the size information included in the map information that has been read out;
    acquiring the picture from the video stream based on the result of the determination, and the start position information and the size information included in the map information that has been read out; and
    decoding and playing the acquired picture,
    wherein the stipulated data size of 4K resolution of the video stream is larger than the stipulated data size of 2K resolution of the video stream.

3. A playback device that reads out and plays content from a non-transitory recording medium in which are recorded
    a multiplexed digital stream that includes an encoded video information, and
    map information,
    wherein the map information includes
    playback start time information of a picture that is included in the encoded video stream and is independently decodable,
    start position information indicating a data start position of the picture in the multiplexed digital stream, and
    size information (I_MUX_SIZE) indicating a data size of the picture in the multiplexed digital stream is recorded based on a predetermined stipulated data size, and
    the playback device comprising:
    a reader that reads out the map information;
    a determiner that determines the stipulated data size indicated by the size information included in the map information that has been read out;
    an acquirer that acquires the picture from the video stream based on the result of the determination, and the start position information and the size information included in the map information that has been read out; and
    a video player that decodes and plays the acquired picture,
    wherein the stipulated data size of 4K resolution of the video stream is larger than the stipulated data size of 2K resolution of the video stream.

4. A playback method of reading out and playing content from a non-transitory recording medium in which are recorded
    a multiplexed digital stream that includes an encoded video information, and map information,
wherein the map information includes
playback start time information of a picture that is included in the encoded video stream and is independently decodable,
start position information indicating a data start position of the picture in the multiplexed digital stream, and
size information (I_MUX_SIZE) indicating a data size of the picture in the multiplexed digital stream is recorded based on a predetermined stipulated data size,
the playback method comprising:
reading out the map information;
determining the stipulated data size indicated by the size information included in the map information that has been read out;
acquiring the picture from the video stream based on the result of the determination, and the start position information and the size information included in the map information that has been read out; and
decoding and playing the acquired picture,
wherein the stipulated data size of 4K resolution of the video stream is larger than the stipulated data size of 2K resolution of the video stream.

* * * * *